(12) United States Patent
Takahashi et al.

(10) Patent No.: US 11,475,892 B2
(45) Date of Patent: Oct. 18, 2022

(54) SPEECH CONTROL SYSTEM, SPEECH CONTROL METHOD, IMAGE PROCESSING APPARATUS, SPEECH CONTROL APPARATUS, AND STORAGE MEDIUM

(71) Applicant: CANON KABUSHIKI KAISHA, Tokyo (JP)

(72) Inventors: Toru Takahashi, Chiba (JP); Takeshi Matsumura, Chiba (JP); Yuji Naya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 17/093,726

(22) Filed: Nov. 10, 2020

(65) Prior Publication Data

US 2021/0151053 A1      May 20, 2021

(30) Foreign Application Priority Data

Nov. 14, 2019   (JP) .............................. JP2019-206353

(51) Int. Cl.
*G10L 15/22*    (2006.01)
*G10L 13/02*    (2013.01)
*H04N 1/00*     (2006.01)
*G06F 3/16*     (2006.01)

(52) U.S. Cl.
CPC .............. *G10L 15/22* (2013.01); *G06F 3/167* (2013.01); *G10L 13/02* (2013.01); *H04N 1/00403* (2013.01); *G10L 2015/223* (2013.01)

(58) Field of Classification Search
CPC ...................................................... G10L 15/22
See application file for complete search history.

(56) References Cited

U.S. PATENT DOCUMENTS

| 6,047,288 A * | 4/2000 | Kurosawa | .............. G06Q 10/10 707/999.009 |
| 9,548,050 B2 | 1/2017 | Gruber | |
| 2020/0175984 A1 * | 6/2020 | Iwasa | ...................... G10L 15/22 |

FOREIGN PATENT DOCUMENTS

JP      2014222513 A      11/2014

* cited by examiner

*Primary Examiner* — Ibrahim Siddo
(74) *Attorney, Agent, or Firm* — Rossi, Kimms & McDowell LLP

(57) ABSTRACT

There is provided a speech control system including: a microphone configured to acquire speech; a speaker configured to output speech; an image processing unit; and a controller configured to control settings of the image processing unit. The controller is configured to: specify one or more setting items represented by an input speech of a user acquired by the microphone that are to be set for the image processing unit, and depending on whether or not the specified one or more setting items satisfy a reading condition, cause the speaker to output a first response speech that reads the one or more setting items, or a second response speech that does not read at least one out of the one or more setting items.

15 Claims, 20 Drawing Sheets

FIG. 8

| INTENT ID | UTTERANCE |
|---|---|
| Copy_simple | Make a {CopyOperation} |
| | Want to have a {CopyOperation} |
| | Start {CopyOperation} |
| | {ScanOperation} and {PrintOperation} |
| | {PrintOperation} {ScanOperation} image |
| | ... |
| Copy_with_noc | Make {NUMBER} {CopyOperation} |
| | Want to have {NUMBER} {CopyOperation} |
| | {ScanOperation} and make {NUMBER} {PrintOperation} |
| | Make {NUMBER} {PrintOperation} of {ScanOperation} image |
| | ... |
| Copy_with_2_settings | Make {NUMBER} {CopyOperation} in {ColorMode} |
| | Want to have {NUMBER} {CopyOperation} in {ColorMode} |
| | Make {NUMBER} {CopyOperation} in {PaperSide} |
| | Want to have {NUMBER} {CopyOperation} in {PaperSide} |
| | Make a {CopyOperation} in {PaperSide} and {ColorMode} |
| | Want to have a {CopyOperation} in {PaperSide} and {ColorMode} |
| | ... |
| Copy_with_3_settings | Make {NUMBER} {CopyOperation} in {PaperSide} and {ColorMode} |
| | Make {NUMBER} {CopyOperation} in {ColorMode} and {PaperSide} |
| | Want to have {NUMBER} {CopyOperation} in {PaperSide} and {ColorMode} |
| | Want to have {NUMBER} {CopyOperation} in {ColorMode} and {PaperSide} |
| | {ScanOperation} and make {NUMBER} {CopyOperation} in {PaperSide} and {ColorMode} |
| | {ScanOperation} and make {NUMBER} {CopyOperation} in {ColorMode} and {PaperSide} |
| | ... |

FIG. 9

| INTENT ID | UTTERANCE |
|---|---|
| Copy_with_4_settings | Make [NUMBER] [CopyOperation] in [PaperSide] and [ColorMode] with [Finishing] at [Position] |
| | Make [NUMBER] [CopyOperation] in [ColorMode] and [PaperSide] with [Finishing] at [Position] |
| | Want to have [NUMBER] [CopyOperation] in [PaperSide] and [ColorMode] with [Finishing] at [Position] |
| | Want to have [NUMBER] [CopyOperation] in [ColorMode] and [PaperSide] with [Finishing] at [Position] |
| | [ScanOperation] and make [NUMBER] [CopyOperation] in [PaperSide] and [ColorMode] with [Finishing] at [Position] |
| | [ScanOperation] and make [NUMBER] [CopyOperation] in [ColorMode] and [PaperSide] with [Finishing] at [Position] |
| | : |
| Send_simple | [SendOperation] [PaperType] |
| | Want to [SendOperation] |
| | [ScanOperation] and [SendOperation] |
| | [ScanOperation] [PaperType] and [SendOperation] |
| | : |
| Send_with_destination | [SendOperation] to [Address_LastName] |
| | [SendOperation] [PaperType] to [Address_LastName] |
| | [ScanOperation] original to [SendOperation] to [Address_LastName] |
| | : |
| Send_with_2_settings | [SendOperation] in [PaperSide] and [ColorMode] |
| | Want to [SendOperation] in [PaperSide] and [ColorMode] |
| | [ScanOperation] and [SendOperation] in [PaperSide] and [ColorMode] |
| | : |
| Print_Simple | [PrintOperation] |
| | Want to [PrintOperation] |
| | Start [PrintOperation] |
| | [PrintOperation] entered job |
| | Make [Quantity] [PrintOperation] of entered job |
| | : |

FIG. 10

| ENTITY ID | VALUE ID | VALUE SYNONYMS |
|---|---|---|
| FREE_WORD | | |
| NUMBER | | Zero<br>One<br>Two<br>⋮ |
| Quantity | on_00000 | All<br>Whole |
| | on_00001 | One<br>Single |
| | on_00002 | Two<br>Double |
| | on_00003 | Three<br>Triple |
| OneAlphabet | chr_00000 | a |
| | chr_00001 | b |
| | chr_00002 | c |
| | ⋮ | ⋮ |
| Color | col_00000 | Red |
| | col_00001 | Green |
| | col_00002 | Blue |
| | col_00003 | Yellow |
| | ⋮ | ⋮ |
| ColorMode | cm_00000 | Grayscale |
| | cm_00001 | Black and White<br>Monochrome |
| | ⋮ | ⋮ |
| | cm_00005 | Full-Color<br>Color |
| CopyOperation | copy_00000 | Copy<br>Copies<br>Replication<br>Replications |
| PrintOperation | print_00000 | Print<br>Prints |
| ScanOperation | scan_00000 | Scan<br>Read |
| StoreOperation | store_00000 | Store<br>Save |
| SendOperation | send_00000 | Send<br>Transmit<br>Forward |

FIG. 11

| ENTITY ID | VALUE ID | VALUE SYNONYMS |
|---|---|---|
| PaperSize | psize_00000 | A3 |
| | psize_00001 | A4 |
| | psize_00002 | A5 |
| | psize_00003 | B4 |
| PaperType | ptype_00000 | OHP Sheet<br>Foil<br>Transparent Film |
| | ptype_00001 | Regular Paper |
| | ptype_00002 | Recycled Paper |
| PaperSide | pside_00000 | One Side<br>Single Side |
| | pside_00001 | Both Side<br>Double Side |
| | pside_00002 | Top and Bottom |
| Position | pos_00000 | Top |
| | pos_00001 | Top Right |
| | pos_00002 | Right |
| | ⋮ | ⋮ |
| | pos_00011 | Right and Left<br>Left and Right |
| Direction | dir_00000 | Vertical |
| | dir_00001 | Horizontal |
| | dir_00010 | Short Side<br>Shorter Side |
| | dir_00011 | Long Side<br>Longer Side |
| | dir_00020 | Portrait |
| | dir_00021 | Landscape |

FIG. 12

| ENTITY ID | VALUE ID | VALUE SYNONYMS |
|---|---|---|
| Address_LastName | lastname_00000 | Sato |
| | lastname_00001 | Suzuki |
| | lastname_00002 | Takahashi |
| | : | : |
| Address_FirstName | firstname_00000 | Ichiro |
| | firstname_00001 | Jiro |
| | firstname_00002 | Saburo |
| | : | : |
| Address_NameTitle | nametitle_00000 | Mr. |
| | nametitle_00001 | Ms. |
| | nametitle_00002 | Miss. |
| | nametitle_00003 | Dr. |
| | : | : |
| Finishing | fin_00000 | Staple |
| | fin_00001 | Punch |
| | fin_00002 | Fold |
| Timing | timing_00000 | Today |
| | timing_00001 | Yesterday |
| | timing_00002 | Day Before Yesterday |
| | timing_00003 | Previous Last Time |
| Frequency | freq_00000 | Every Time Regular |
| | freq_00001 | Frequently-Used Usual |
| Change | change_00000 | The Same Similar No Change |
| | change_00001 | Small Scale Down Shrink |
| | change_00002 | Large Scale Up Enlarge |
| | change_00003 | Strongly Intensely |
| | change_00004 | Weakly Thinly |

FIG. 13A

```
{
 "Intent ID" : "Copy_simple",
 "Entities" : [
   {
     "Entity ID" : "CopyOperation",
     "Value ID" : "copy_00000"
   }
 ]
}
```

FIG. 13B

```
{
 "Intent ID" : "Copy_with_noc",
 "Entities" : [
   {
     "Entity ID" : "NUMBER",
     "Value ID" : "2"
   },
   {
     "Entity ID" : "CopyOperation",
     "Value ID" : "copy_00000"
   }
 ]
}
```

FIG. 13C

```
{
  "Intent ID" : "Copy_with_4_settings",
  "Entities" : [
    {
      "Entity ID" : "ColorMode",
      "Value ID" : "cm_00005"
    },
    {
      "Entity ID" : "PaperSide",
      "Value ID" : "pside_00001"
    },
    {
      "Entity ID" : "NUMBER",
      "Value ID" : "十"
    },
    {
      "Entity ID" : "Position",
      "Value ID" : "pos_00007"
    },
    {
      "Entity ID" : "Finishing",
      "Value ID" : "fin_00000"
    },
    {
      "Entity ID" : "CopyOperation",
      "Value ID" : "copy_00000"
    }
  ]
}
```

SPEECH CONTROL SYSTEM, SPEECH CONTROL METHOD, IMAGE PROCESSING APPARATUS, SPEECH CONTROL APPARATUS, AND STORAGE MEDIUM

BACKGROUND OF THE INVENTION

Field of the Invention

The present disclosure relates to a speech control system, a speech control method, an image processing apparatus, a speech control apparatus, and a storage medium.

Description of the Related Art

An apparatus such as an image forming apparatus that forms an image on a sheet and an image reading apparatus that reads an original executes a job in accordance with a user input detected via a user interface. In this manner, an operation of the apparatus as intended by the user is realized. However, along with improvement of processable image quality, the multi-functionality of the apparatus is advancing year by year, and the number of setting items of a job is accordingly increasing. The increase in number of setting items complicates understanding and the operation of the user with respect to a setting method for the apparatus, thereby imposing an excessive burden on the user.

As a technique for allowing a user to interact with a system with a small burden, there is known a user interface based on speech recognition (also referred to as a speech UI hereinafter). For example, Japanese Patent Laid-Open No. 2014-222513 discloses a speech UI capable of providing, for example, a restaurant reservation service through interaction with a user by interpreting the user's intent from a user input given in a natural language.

SUMMARY OF THE INVENTION

However, the speech UI does not always perform speech recognition correctly, and it is thus necessary to take a measure to prevent an operation error caused by a recognition error. In Japanese Patent Laid-Open No. 2014-222513, an attempt is made to prevent an operation error by including, in a response to the user, a speech recognition result with respect to the place of a restaurant to be reserved or the type of food. However, as described above, if a multifunctional apparatus outputs all recognized setting items by speech, a response speech is redundant, thereby impairing smooth interaction with the user. A redundant response from a system may increase the burden on the user.

It is, therefore, desired to provide a mechanism for mitigating the burden on the user when setting the multi-functional apparatus using the speech UI.

According to one aspect, there is provided a speech control system that includes: a microphone configured to acquire speech; a speaker configured to output speech; an image processing unit; and a controller configured to control settings of the image processing unit. The controller is configured to: specify one or more setting items represented by an input speech of a user acquired by the microphone that are to be set for the image processing unit, and depending on whether or not the specified one or more setting items satisfy a reading condition, cause the speaker to output a first response speech that reads the one or more setting items, or a second response speech that does not read at least one out of the one or more setting items. A corresponding method, image processing apparatus, speech control apparatus, and storage medium are also provided.

Further features of the present invention will become apparent from the following description of exemplary embodiments (with reference to the attached drawings).

BRIEF DESCRIPTION OF THE DRAWINGS

FIG. 8 is the first explanatory view showing an example of an intent list;

FIG. 9 is the second explanatory view showing an example of the intent list;

FIG. 10 is the first explanatory view showing an example of an entity list;

FIG. 11 is the second explanatory view showing an example of the entity list;

FIG. 12 is the third explanatory view showing an example of the entity list;

FIG. 13A is an explanatory view showing an example of intent data according to an embodiment;

FIG. 13B is an explanatory view showing another example of the intent data according to an embodiment;

FIG. 13C is an explanatory view showing still another example of the intent data according to an embodiment;

DESCRIPTION OF THE EMBODIMENTS

Figure 1:
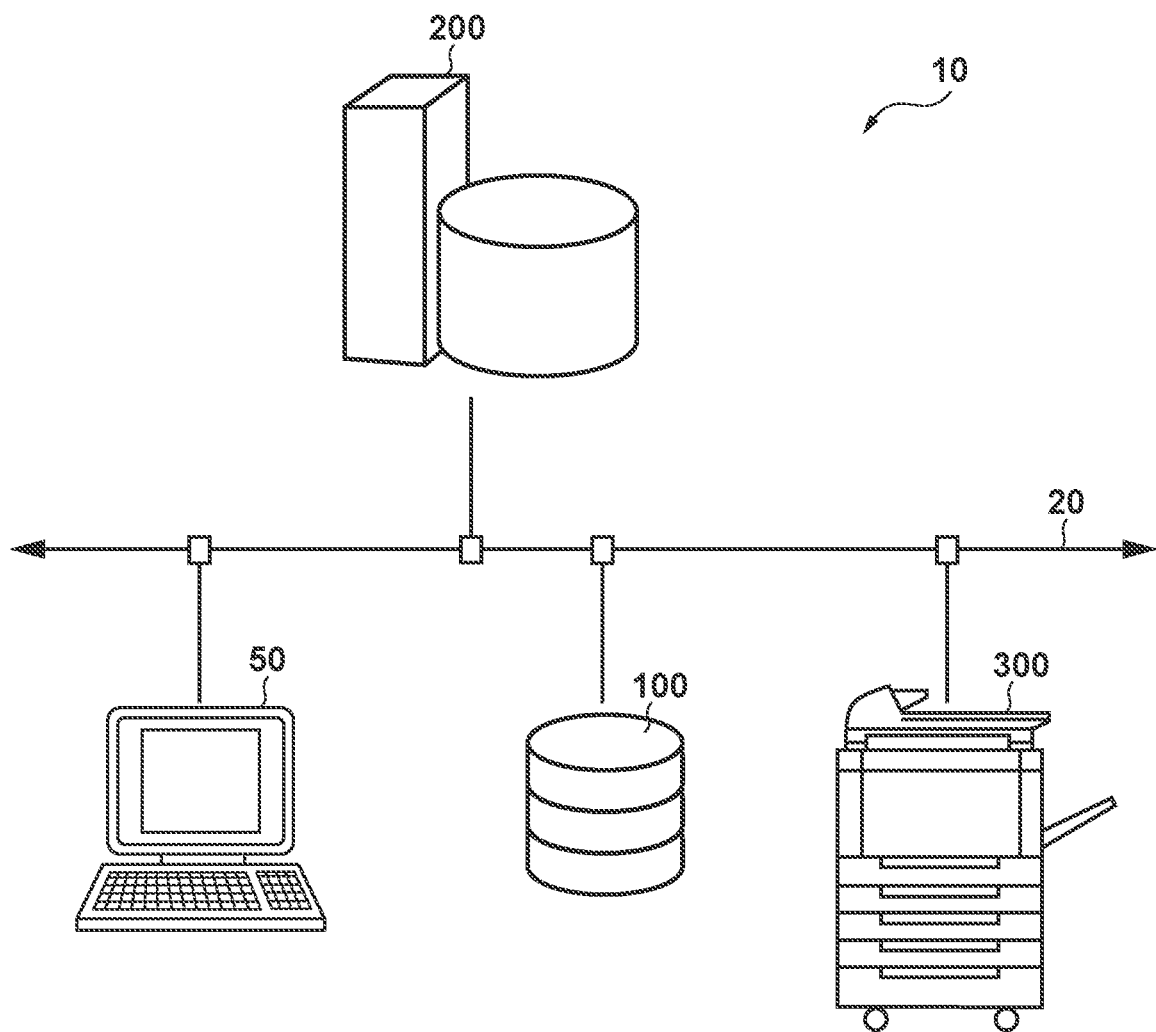
FIG. 1 is a schematic view showing an example of a configuration of an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

1. Example of Configuration of System

1-1. Overview of System

FIG. 1 is a schematic view showing an example of the configuration of a speech control system 10 according to an embodiment. Referring to FIG. 1, the speech control system 10 includes a client terminal 50, a speech control apparatus 100, a speech recognition server 200, and an image processing apparatus 300. FIG. 1 shows an example in which there exist one client terminal 50, one speech control apparatus 100, one speech recognition server 200, and one image processing apparatus 300, but the speech control system 10 may include more apparatuses and servers.

A network 20 is a communication network that interconnects the client terminal 50, the speech control apparatus 100, the speech recognition server 200, and the image processing apparatus 300. The network 20 may be either a wired network or a wireless network. The network 20 may be, for example, the Internet, a LAN (Local Area Network), a WAN (Wide Area Network), a cellular network, or an arbitrary combination thereof. The network 20 may include one or more network apparatuses such as a router, gateway, proxy server, and wireless LAN access point (none are shown).

The client terminal 50 is a terminal apparatus used by a user of the speech control system 10. The client terminal 50 may be, for example, a general-purpose information terminal such as a PC (Personal Computer) or a smartphone, or a dedicated terminal specialized for a specific business purpose. The client terminal 50 may be used to, for example, issue a print job for causing the image processing apparatus 300 to print electronic data, or to receive read image data generated by reading an original in the image processing apparatus 300.

The speech control apparatus 100 is an apparatus that controls acquisition of an input speech of the user and output of a response speech from the speech control system 10 to the user. The speech control apparatus 100 may be, for example, an independent apparatus for speech input/output such as a smart speaker. The speech control apparatus 100 may also be an information terminal having an agent function for speech input/output, similar to the client terminal 50. The function of the speech control apparatus 100 to be described in this specification may be integrated in the image processing apparatus 300. When a start of speech interaction is instructed, the speech control apparatus 100 acquires an input speech of the user via a microphone to generate input speech data, and transmits the input speech data (after encoding as necessary) to the speech recognition server 200. Furthermore, the speech control apparatus 100 reproduces response speech data received from the speech recognition server 200 (after decoding as necessary) to output a response speech via a speaker.

The speech recognition server 200 is a server apparatus that performs speech recognition of the input speech and synthesis of the response speech. The speech recognition server 200 may be an information processing apparatus such as a computer or a workstation. The speech recognition server 200 recognizes the input speech represented by the speech data received from the speech control apparatus 100 to interpret the user's intent. Then, if it is determined that the user intends to operate the image processing apparatus 300, the speech recognition server 200 transmits data (referred to as intent data hereinafter) representing the user's intent to the image processing apparatus 300. Furthermore, the speech recognition server 200 synthesizes the response speech data based on response text data received from the image processing apparatus 300, and transmits the response speech data to the speech control apparatus 100.

The image processing apparatus 300 is, for example, an apparatus having at least one of an image forming (print) function and an image reading (scan) function. Examples of the image processing apparatus 300 can include a copy machine, a digital scanner, a printer, a facsimile transmitter, and a multifunctional peripheral having two or more functions of the above apparatuses. The image forming function of the image processing apparatus 300 forms an image on a sheet in accordance with, for example, a print job received from the client terminal 50. The original reading function generates image data by reading an original placed on an original platen or set in an ADF (Auto-Document Feeder), for example, and transmits the generated image data to the client terminal 50. Note that the image processing apparatus 300 is not limited to the above-described example, and may be an arbitrary kind of apparatus that processes an image like an image capturing apparatus.

<1-2. Arrangement of Each Apparatus>

(1) Speech Control Apparatus

Figure 2:
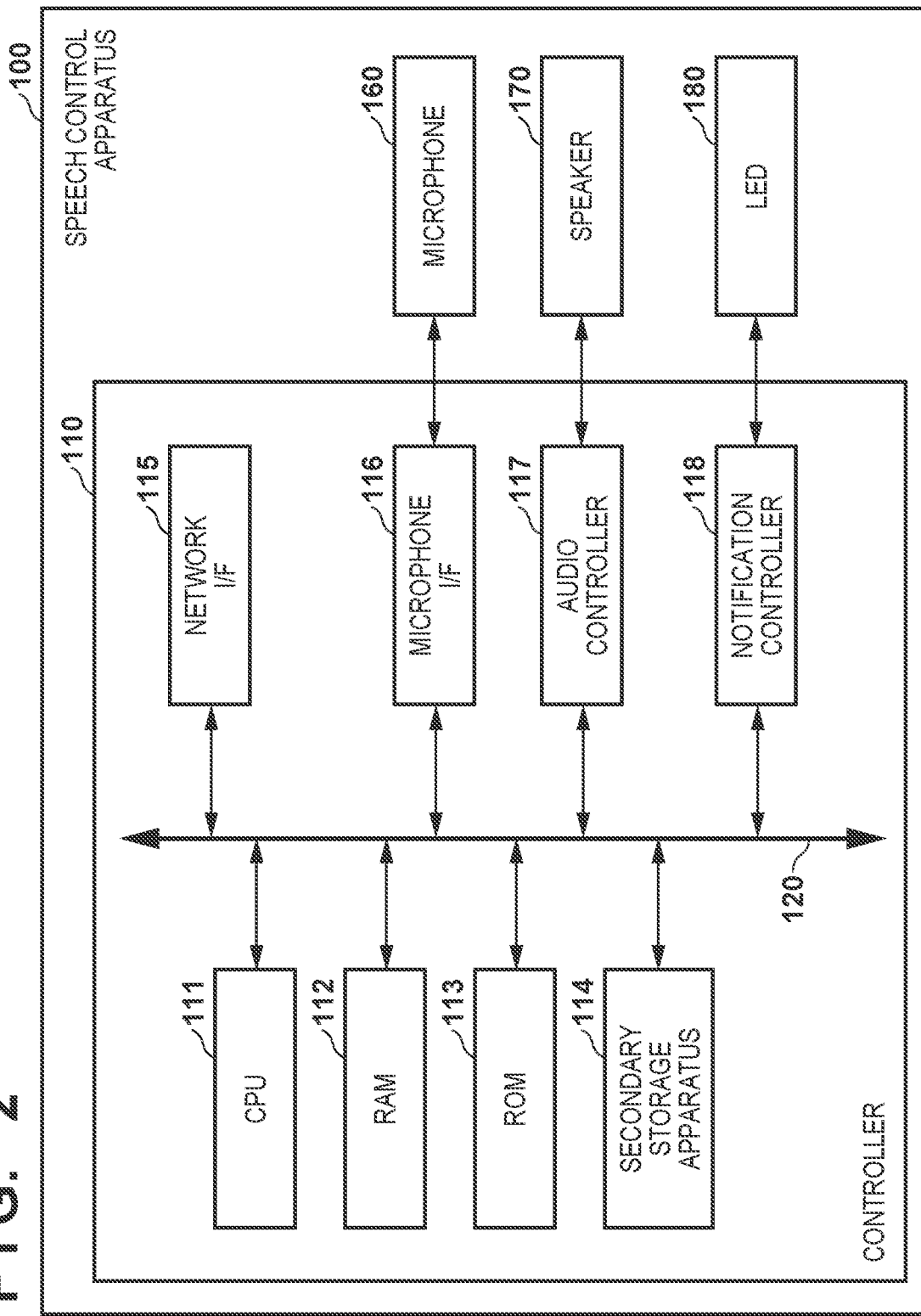
FIG. 2 is a block diagram showing an example of a physical arrangement of a speech control apparatus according to an embodiment.

FIG. 2 is a block diagram showing an example of a physical arrangement of the speech control apparatus 100 according to this embodiment. Referring to FIG. 2, the speech control apparatus 100 includes a controller 110, a microphone 160, a speaker 170, and an LED 180. The controller 110 includes a CPU 111, a RAM 112, a ROM 113, a secondary storage apparatus 114, a network I/F 115, a microphone I/F 116, an audio controller 117, and a notification controller 118. An internal bus 120 is a signal line that interconnects the CPU 111, the RAM 112, the ROM 113, the secondary storage apparatus 114, the network I/F 115, the microphone I/F 116, the audio controller 117, and the notification controller 118.

The CPU (Central Processing Unit) 111 is a processor that controls the overall operation of the speech control apparatus 100. The control function of the CPU 111 can be implemented by, for example, executing a computer program stored in advance in the ROM 113 or the secondary storage apparatus 114 and loaded into the RAM 112. The computer program may be downloaded from the outside of the speech control apparatus 100. The RAM (Random Access Memory) 112 is a volatile memory, and provides a temporary work memory area to the CPU 111. The ROM (Read Only Memory) 113 is a nonvolatile memory, and stores, for example, a boot program for activating the speech control apparatus 100. The secondary storage apparatus 114 is an auxiliary storage device that provides a large memory area, as compared with the RAM 112 and the ROM 113. The secondary storage apparatus 114 may include a detachable storage medium like, for example, an SD card. The network interface (I/F) 115 is a communication interface for communication with another apparatus by the speech control apparatus 100. The network I/F 115 may wirelessly transmit/receive data in accordance with a wireless communication standard such as Wi-Fi or Bluetooth®, or may transmit/receive data via a cable in accordance with a wired communication standard such as Ethernet®. For wireless communication, the network I/F 115 may include an antenna, an RF (Radio Frequency) circuit, and a baseband circuit.

The microphone I/F 116 is a connection interface for connecting the controller 110 to the microphone 160. The microphone 160 is a device for acquiring speech in an environment where the speech control apparatus 100 is placed. The microphone 160 may be, for example, an ECM (Electret Condenser Microphones) or MEMS (Micro-Electrical-Mechanical Systems) microphone. The MEMS microphone is highly reliable and is small in size, and is thus widely adopted in a terminal apparatus such as a smartphone. FIG. 2 shows an example in which the speech control apparatus 100 includes one microphone 160. However, the speech control apparatus 100 may include, for example, three or more microphones at different positions in order to estimate the incoming direction of an input speech. This embodiment is not limited to a specific type of microphone or a specific number of microphones. For example, the microphone 160 acquires an input speech uttered by the user, and outputs a speech signal representing the acquired speech to the controller 110 via the microphone I/F 116. The microphone I/F 116 generates input speech data by encoding the speech signal, and writes the input speech data in the RAM 112 under the control of the CPU 111.

The audio controller 117 is a controller that is connected to the speaker 170 and controls the output of speech by the speech control apparatus 100 via the speaker 170. The speaker 170 is a device for outputting (or reproducing) speech. FIG. 2 shows an example in which the speech control apparatus 100 includes one speaker 170. However, the speech control apparatus 100 may include, for example, two or more speakers to output a directional speech. This embodiment is not limited to a specific type of speaker or a specific number of speakers. Under the control of the CPU 111, the audio controller 117 generates an analog speech signal by decoding output speech data (for example, response speech data), and outputs the speech signal to the speaker 170. The speaker 170 outputs speech to the environment (for example, to the user) based on the input speech signal. Note that in this specification, the term "speech" includes not only an uttered or synthesized speech but also a simpler sound.

The notification controller 118 is a controller that is connected to the LED 180 and controls a notification of a status by the speech control apparatus 100 via the LED 180. The LED (Light-Emitting Diode) 180 is an element that emits light, and represents the status of the speech control apparatus 100 by an emission color and a lighting pattern (for example, ON, flickering, or OFF). Under the control of the CPU 111, the notification controller 118 uses the LED 180 to notify the user of a status of the speech control apparatus 100, such as a standby, speech-inputting, and responding. Note that the speech control apparatus 100 may include a display that can display a letter, a figure, and an image instead of the LED 180 for the notification of the status.

(2) Speech Recognition Server

Figure 3:
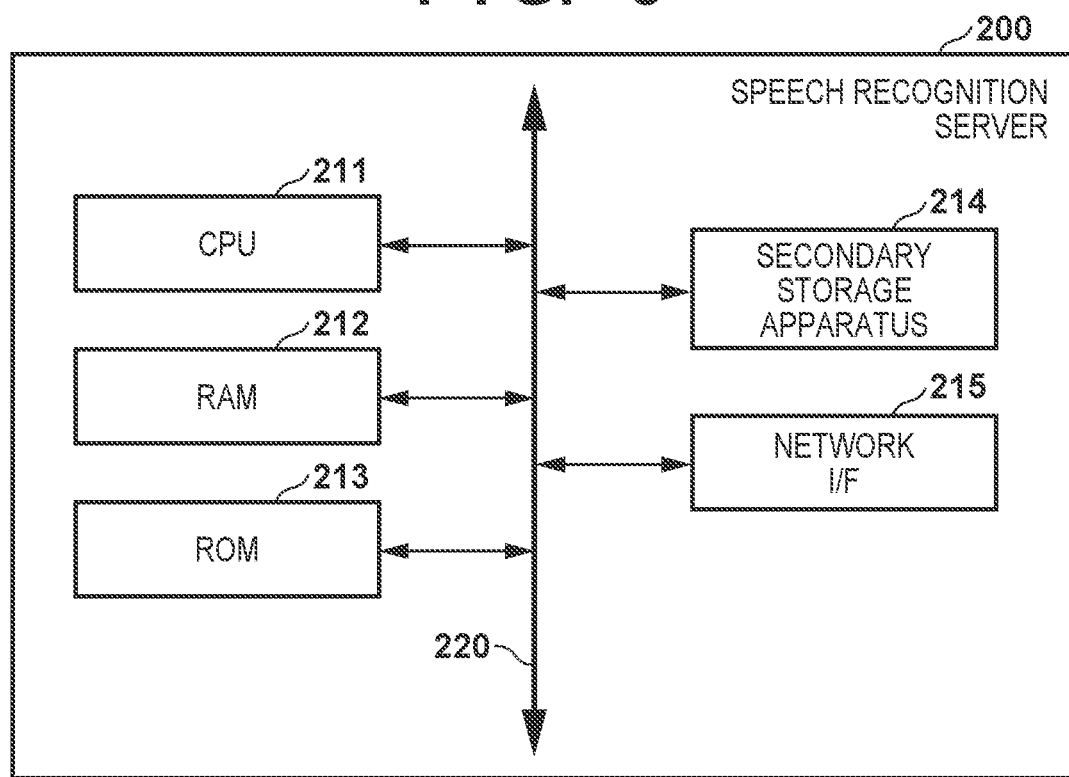
FIG. 3 is a block diagram showing an example of a physical arrangement of a speech recognition server according to an embodiment.

FIG. 3 is a block diagram showing an example of a physical arrangement of the speech recognition server 200 according to this embodiment. Referring to FIG. 3, the speech recognition server 200 includes a CPU 211, a RAM 212, a ROM 213, a secondary storage apparatus 214, and a network I/F 215. An internal bus 220 is a signal line that interconnects the CPU 211, the RAM 212, the ROM 213, the secondary storage apparatus 214, and the network I/F 215.

The CPU 211 is a processor that controls the overall operation of the speech recognition server 200. The control function of the CPU 211 can be implemented by, for example, executing a computer program stored in advance in the ROM 213 or the secondary storage apparatus 214 and loaded into the RAM 212. The computer program may be downloaded from the outside of the speech recognition server 200. The RAM 212 is a volatile memory, and provides a temporary work memory area to the CPU 211. The ROM 213 is a nonvolatile memory, and stores, for example, a boot program for activating the speech recognition server 200. The secondary storage apparatus 214 is an auxiliary storage device that provides a large memory area, as compared with the RAM 212 and the ROM 213. The secondary storage apparatus 214 may be, for example, an HDD (Hard Disk Drive) or an SSD (Solid State Drive). The network I/F 215 is a communication interface for communication with another apparatus by the speech recognition server 200. The network I/F 215 may transmit/receive data wirelessly or via a cable. For wireless communication, the network I/F 215 may include an antenna, an RF circuit, and a baseband circuit.

(3) Image Processing Apparatus

Figure 4:
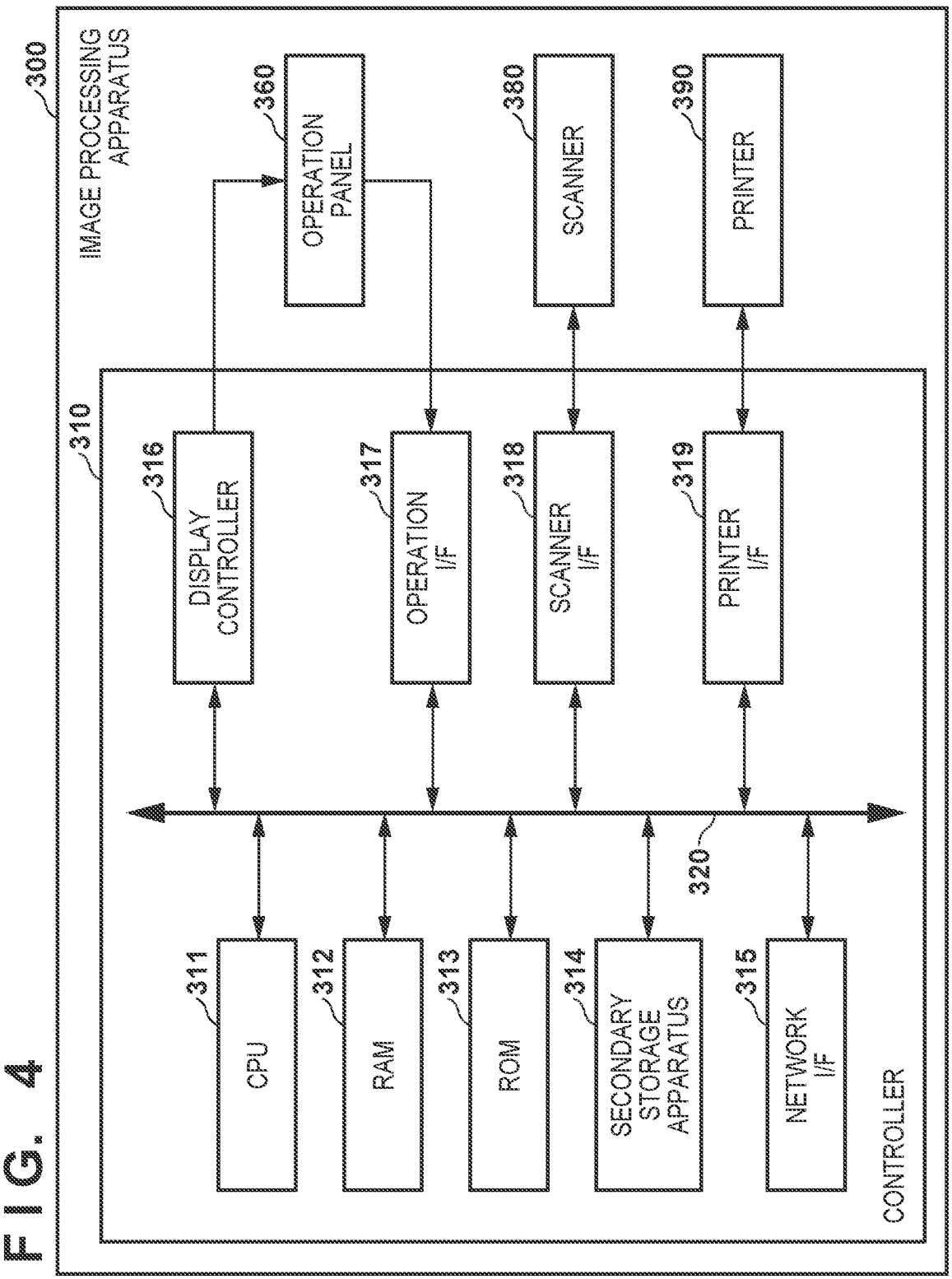
FIG. 4 is a block diagram showing an example of a physical arrangement of an image processing apparatus according to an embodiment.

FIG. 4 is a block diagram showing an example of a physical arrangement of the image processing apparatus 300 according to this embodiment. Referring to FIG. 4, the image processing apparatus 300 includes a controller 310, an operation panel 360, a scanner 380, and a printer 390. The controller 310 includes a CPU 311, a RAM 312, a ROM 313, a secondary storage apparatus 314, a network I/F 315, a display controller 316, an operation I/F 317, a scanner I/F 318, and a printer I/F 319. An internal bus 320 is a signal line that interconnects the CPU 311, the RAM 312, the ROM 313, the secondary storage apparatus 314, the network I/F 315, the display controller 316, the operation I/F 317, the scanner I/F 318, and the printer I/F 319.

The CPU 311 is a processor that controls the overall operation of the image processing apparatus 300. The control function of the CPU 311 can be implemented by, for example, executing a computer program stored in advance in the ROM 313 or the secondary storage apparatus 314 and loaded into the RAM 312. The computer program may be downloaded from the outside of the image processing apparatus 300. The RAM 312 is a volatile memory, and provides a temporary work memory area to the CPU 311. The ROM 313 is a nonvolatile memory, and stores, for example, a boot program for activating the image processing apparatus 300. The secondary storage apparatus 314 is an auxiliary storage device that provides a large memory area, as compared with the RAM 312 and the ROM 313. The secondary storage apparatus 314 may be, for example, an HDD or an SSD. The network I/F 315 is a communication interface for communication with another apparatus by the image processing apparatus 300. The network I/F 315 may transmit/receive data wirelessly or via a cable. For wireless communication, the network I/F 315 may include an antenna, an RF circuit, and a baseband circuit.

The display controller 316 and the operation I/F 317 are connected to the operation panel 360. Under the control of the CPU 311, the display controller 316 displays a user interface (UI) image on the operation panel 360. The operation panel 360 is a display device that can display an image. The operation panel 360 may be, for example, a touch panel that accepts a touch input by the user. Instead, the operation panel 360 may be a display such as an LCD (Liquid Crystal Display) accompanied with, for example, an input device such as a keypad and buttons. The operation panel 360 outputs, to the controller 310 via the operation I/F 317, an operation signal indicating contents of the accepted user input. Under the control of the CPU 311, the operation I/F 317 writes the contents of the user input indicated by the operation signal in the RAM 312.

The scanner I/F 318 is a connection interface for connecting the controller 310 to the scanner 380. The scanner 380 is an image processing unit that reads an original to generate image data of a read image. That is, the scanner 380 provides the original reading function of the image processing apparatus 300. The scanner 380 may include one or both of an original platen on which an original is placed and an ADF for automatically conveying an original (neither of which is shown). Under the control of the CPU 311, the scanner I/F 318 transmits, to the scanner 380, a control command (also referred to as a job hereinafter) for instructing reading of an original, and writes image data received from the scanner 380 in the RAM 312.

The printer I/F 319 is a connection interface for connecting the controller 310 to the printer 390. The printer 390 is an image processing unit that forms an image on a sheet based on image data received from the controller 310. That is, the printer 390 provides the image forming function of the image processing apparatus 300. Under the control of the CPU 311, the printer I/F 319 transmits, to the printer 390, a control command for instructing formation of an image, and writes the result of an image forming operation received from the printer 390 in the RAM 312.

<1-3. Functionality of Each Apparatus>

(1) Speech Control Apparatus

Figure 5:
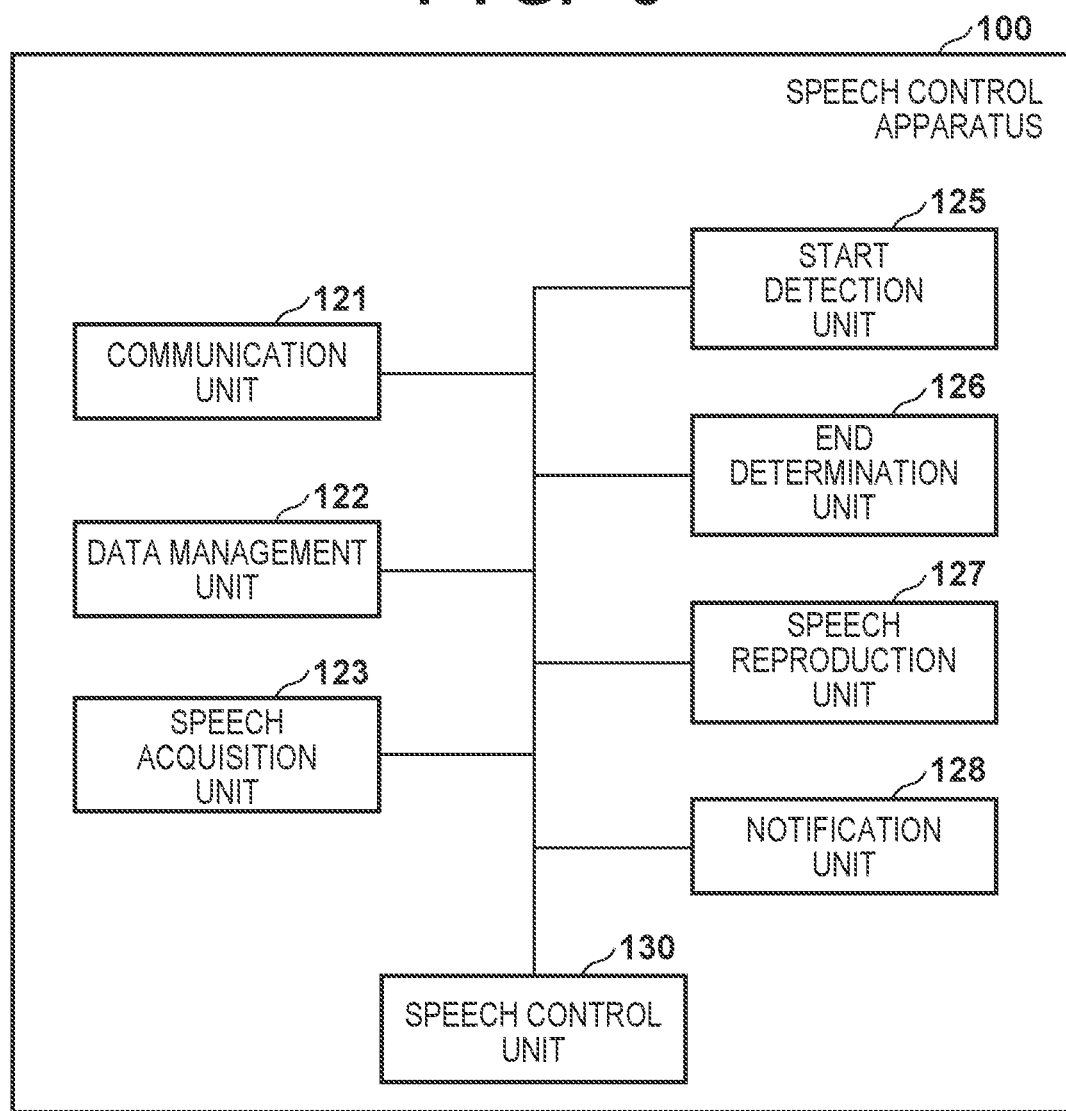
FIG. 5 is a block diagram showing an example of a functional arrangement of the speech control apparatus according to an embodiment.

FIG. 5 is a block diagram showing an example of a functional arrangement of the speech control apparatus 100 according to this embodiment. Referring to FIG. 5, the speech control apparatus 100 includes a communication unit 121, a data management unit 122, a speech acquisition unit 123, a start detection unit 125, an end determination unit 126, a speech reproduction unit 127, a notification unit 128, and a speech control unit 130. Each of these functional blocks can be realized by, for example, the CPU 111 of the speech control apparatus 100 executing a corresponding computer program in cooperation with other hardware.

The communication unit 121 transmits data to another apparatus connected to the network 20 and receives data from the other apparatus via the network I/F 115. For example, the communication unit 121 transmits input speech data (to be described later) to the speech recognition server 200. The communication unit 121 receives response speech data from the speech recognition server 200.

The data management unit 122 uses the secondary storage apparatus 114 to manage data necessary to control speech input/output by the speech control apparatus 100. In this specification, data management can include, for example, saving of data in a predetermined memory area, update of data, restriction on access to data, and reading of data. For example, the data management unit 122 manages, in a predetermined memory area of the secondary storage apparatus 114, authentication information necessary for communication with the speech recognition server 200.

The speech acquisition unit 123 converts an analog speech signal of speech acquired by the microphone 160 into speech data, and temporarily holds the speech data in the RAM 112. For example, the speech acquisition unit 123 may format the speech data in accordance with a speech file format (for example, an MP3 format) supported by both the speech control apparatus 100 and the speech recognition server 200.

The start detection unit 125 monitors a user input to the speech control apparatus 100, and determines, based on the detected user input, whether to start interaction with the user by the speech control apparatus 100 using the speech UI. For example, if, based on the speech data acquired by the speech acquisition unit 123, it is recognized that the user utters a wake word to start interaction, the start detection unit 125 may determine to start interaction with the user. If, for example, it is detected that the user performs a predetermined operation (for example, presses a button) on the input device (not shown) of the speech control apparatus 100, the start detection unit 125 may determine to start interaction with the user. If the start detection unit 125 determines to start interaction with the user, it outputs a control start signal to the speech control unit 130. The character string or speech waveform of the above-described wake word is decided in advance and registered in the speech control apparatus 100 (managed as data by the data management unit 122). The user can operate the image processing apparatus 300 as intended by himself/herself by uttering the wake word and then uttering an operation of the image processing apparatus 300 together with desired setting contents.

The end determination unit 126 determines an end timing of an individual speech input from the user based on the speech data acquired by the speech acquisition unit 123. As an example, if the end determination unit 126 compares the characteristic of an input speech signal with that of a known speech, and determines that the user or a person has not uttered for at least a given period, it can determine that an individual speech input has ended (an utterance has stopped). The characteristic of the known speech may be a user-specific characteristic registered in advance for each user who uses the speech control system 10 or the characteristic of speech of a standard person (that is, the characteristic of speech common to a plurality of users). As another example, if, based on the speech data acquired by the speech acquisition unit 123, the end determination unit 126 recognizes that the user has uttered a specific keyword, it may determine that an individual speech input has ended. As still another example, end determination may be performed by analyzing the meaning or context of the input speech of the user recognized based on the speech data. If the end determination unit 126 determines that an individual speech input has ended, it outputs an utterance end signal to the speech control unit 130. Note that such end determination may be performed by the speech recognition server 200 instead of the end determination unit 126. In the following description, a period during which speech acquired by the speech acquisition unit 123 includes no input speech of the user will be hereinafter referred to as a blank period.

Under the control of the speech control unit 130, the speech reproduction unit 127 uses the audio controller 117 and the speaker 170 to reproduce an output speech represented by speech synthesis data received by the communication unit 121.

Under the control of the speech control unit 130, the notification unit 128 makes various notifications to the user using the notification controller 118 and the LED 180. For example, the notification unit 128 may turn on, flicker, or turn off the LED 180 during a period in which a speech interaction session continues, a period in which an individual input speech is detected, or a period in which a response speech is output. Furthermore, the notification unit 128 may notify the user of the occurrence of an event such as the start or end of a speech interaction session using the LED 180. Note that a notification may also be made to the user by another method such as output of a sound effect or a vibration.

The speech control unit 130 controls acquisition of an input speech of the user and output of a response speech by the speech control apparatus 100 in cooperation with the speech recognition server 200. For example, the speech control unit 130 transmits, to the speech recognition server 200 via the communication unit 121, the speech data acquired by the speech acquisition unit 123, and requests the speech recognition server 200 to recognize the input speech of the user. The speech control unit 130 receives response speech data as a response to the above request from the speech recognition server 200 via the communication unit 121, and causes the speech reproduction unit 127 to reproduce a response speech based on the received response speech data.

Herein, a progress of speech interaction between the user and the speech control apparatus 100 under the control of the speech control unit 130 will be described with some speech examples. The control by the speech control unit 130 starts in response to the input of the control start signal from the start detection unit 125. For example, the speech control unit 130 handles sequential speech data of speech acquired by the speech acquisition unit 123 until the utterance end signal is input from the end determination unit 126, as a series of input speech data. Assume, for example, that the user utters the wake word to the speech control apparatus 100, and then utters "Make two copies in full-color". The wake word is recognized by the start detection unit 125, and the start detection unit 125 outputs the control start signal to the speech control unit 130. In response to the input of the control start signal, the speech control unit 130 causes the speech acquisition unit 123 to start acquiring the input speech. The speech acquisition unit 123 acquires the input speech of "Make two copies in full-color" uttered following the wake word. The end determination unit 126 recognizes a blank period after "Make two copies in full-color", and outputs the utterance end signal to the speech control unit 130. In response to the input of the utterance end signal, the speech control unit 130 causes the speech acquisition unit 123 to end the acquisition of the input speech. During a period in which the speech acquisition unit 123 acquires the series of input speech data, the notification unit 128 notifies the user of the status of speech-inputting by, for example, turning on the LED 180.

Next, the speech control unit 130 transmits, to the speech recognition server 200 via the communication unit 121, the input speech data of "Make two copies in full-color" temporarily held in the RAM 112, and awaits a response from the speech recognition server 200. The response received from the speech recognition server 200 via the communication unit 121 can include response speech data generated by the speech recognition server 200 (to be described later). The response speech data is data representing a response speech of "Please set the original". The speech control unit 130 outputs the response speech data to the speech reproduction unit 127, and causes the speech reproduction unit 127 to reproduce a response speech. As a result, the speaker 170 outputs the response speech. During a period in which the speech reproduction unit 127 reproduces the response speech, the notification unit 128 notifies the user of the status of responding by, for example, flickering the LED 180.

The response from the speech recognition server 200 can include session control information indicating whether to continue or end the speech interaction session. If, for example, the session control information indicates to continue the speech interaction session, the speech control unit 130 causes the speech acquisition unit 123 to restart acquiring an input speech after the end of the reproduction of the response speech. In this case, the user can make a next speech input without uttering the wake word again. This facilitates natural speech interaction between the user and the speech control apparatus 100, and the user can give the system settings and an instruction for a desired operation of the image processing apparatus 300 via a sequence of interactions. If the session control information indicates to end the speech interaction session, for example, the speech control unit 130 causes the notification unit 128 to turn off the LED 180, thereby transitioning to the standby status. In this case, the user can restart the speech interaction by newly uttering the wake word (or by performing the predetermined operation on the speech control apparatus 100).

(2) Speech Recognition Server

Figure 6:
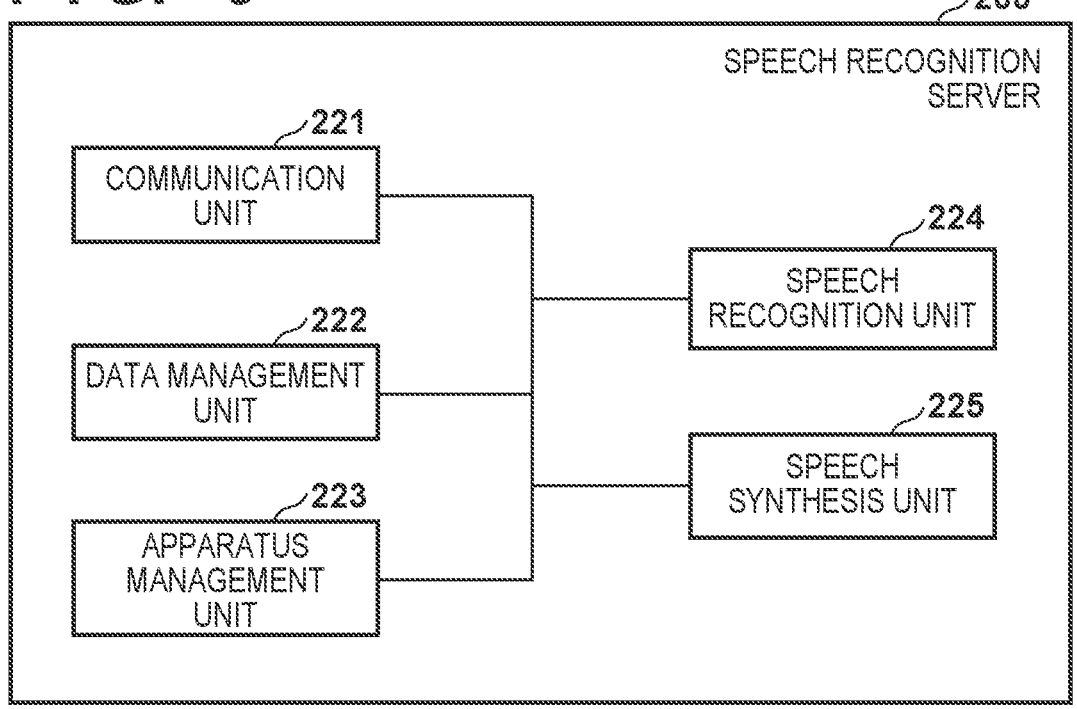
FIG. 6 is a block diagram showing an example of a functional arrangement of the speech recognition server according to an embodiment.

FIG. 6 is a block diagram showing an example of a functional arrangement of the speech recognition server 200 according to this embodiment. Referring to FIG. 6, the speech recognition server 200 includes a communication unit 221, a data management unit 222, an apparatus management unit 223, a speech recognition unit 224, and a speech synthesis unit 225. Each of these functional blocks can be realized by, for example, the CPU 211 of the speech recognition server 200 executing a corresponding computer program in cooperation with other hardware.

The communication unit 221 transmits data to another apparatus connected to the network 20 and receives data from another apparatus via the network I/F 215. For example, the communication unit 221 receives input speech data from the speech control apparatus 100. The communication unit 221 transmits intent data generated by the speech recognition unit 224 (to be described later) to the image processing apparatus 300. The communication unit 221 receives response text data from the image processing apparatus 300. Furthermore, the communication unit 221 transmits, to the speech control apparatus 100, response speech data that can include the above-described session control information.

The data management unit 222 uses the secondary storage apparatus 214 to manage data necessary to recognize and synthesize speech by the speech recognition server 200. For example, the data management unit 222 manages, in a predetermined memory area of the secondary storage apparatus 214, authentication information necessary for communication with the speech recognition server 200. Furthermore, the data management unit 222 manages, for example, an acoustic model, a language model, and word dictionary data for converting an input speech represented by the input speech data into text data as a speech recognition result. In this embodiment, the data management unit 222 manages an intent interpretation data set (to be described later with reference to FIGS. 8 to 13C) used to generate intent data representing the user's intent from the text data derived as the speech recognition result. Furthermore, the data management unit 222 manages speech synthesis dictionary data for generating response speech data from response text data.

The apparatus management unit 223 manages interconnection among the apparatuses included in the speech control system 10. For example, the apparatus management unit 223 manages identification information, address information, and authentication information of each of the client terminal 50, the speech control apparatus 100, and the image processing apparatus 300. Furthermore, the apparatus management unit 223 manages correspondence (for example, a one-to-many relationship) between the speech control apparatus 100 and the image processing apparatus 300 by holding information for mapping the pieces of identification information. The apparatus management unit 223 may further manage history information such as the history of speech interaction by the speech control apparatus 100 and the history of job execution by the image processing apparatus 300. In addition, the apparatus management unit 223 may manage authentication information of users who are allowed to use the speech control system 10 or each apparatus.

The speech recognition unit 224 converts the input speech data received from the speech control apparatus 100 into input text data as a speech recognition result using a known speech recognition technique. For example, the speech recognition unit 224 correlates the waveform and other feature amounts of an input speech represented by the input speech data with the acoustic model, thereby extracting a series of phonemes. Furthermore, the speech recognition unit 224 recognizes text represented by the series of phonemes through morphological analysis, syntactic analysis, semantic analysis, and context analysis using the word dictionary data. The input text data derived as a speech recognition result represents text recognizable in this way. Furthermore, the speech recognition unit 224 recognizes the user's intent represented by the input speech using the intent interpretation data set (to be described in detail later). Then, the speech recognition unit 224 generates intent data indicating the recognition result of the user's intent, and transmits the generated intent data to the image processing apparatus 300 via the communication unit 221.

The speech synthesis unit 225 synthesizes a response speech based on response text data received from the image processing apparatus 300. The response text data is data representing, in the text format, contents of speech to be read by the speech control apparatus 100. More specifically, the speech synthesis unit 225 converts, using the speech synthesis dictionary data managed by the data management unit 222, the response text data into speech data reproducible by the speech control apparatus 100, thereby generating response speech data. The speech synthesis unit 225 may format the generated response speech data in accordance with a speech file format such as an MP3 format.

Recognition of the user's intent based on the input text data by the speech recognition unit 224 is performed using an intent list and an entity list included in the intent interpretation data set. The intent list is a list of text data to be correlated with the input text data to classify contents of the input speech of the user into one of some intent types with respect to operations executable by the image processing apparatus 300. In the following description, each of user's intent types will be hereinafter referred to as an intent.

FIGS. 8 and 9 show an example of the intent list. The intent list includes two data items of "Intent ID" and "Utterance". The intent ID indicates an identifier for identifying each intent. The utterance indicates a sample of text to be correlated with the input text data for classification. As will be understood from FIGS. 8 and 9, in the intent list, contents of a plurality of utterances can be defined for one intent ID. This can classify the user's intent into a correct type in a situation where the same intent is represented by different expressions. The contents of each utterance can include the entity ID enclosed in curly brackets. The entity ID plays a role of a place holder, and one of words associated with an entity ID in the entity list is substituted into the place holder.

FIGS. 10 to 12 show an example of the entity list. The entity list includes four data items of "Entity ID", "Value ID", "Value", and "Synonyms". The entity ID is an identifier for identifying each entity. The value ID is an identifier for identifying a word associated with each entity. The value is a character string representing the word identified by the value ID. Each synonym is a character string representing rephrasing of the same word. In this way, by making it possible to define one or more different synonyms of a representation indicating the same meaning, it is possible to appropriately interpret instruction contents intended by the user in a situation where the same operation or setting is represented by different expressions.

More specifically, the speech recognition unit 224 calculates the degree of similarity between input text data and a text sample obtained by substituting a value or synonym of each entity included in the entity list into each intent included in the intent list. Then, the speech recognition unit 224 classifies an input speech into an intent corresponding to the text sample with which a degree of similarity exceeding a preset threshold is indicated. At the same time, the speech recognition unit 224 acquires the entity ID and value ID of the entity included in the text sample. If the degrees of similarity of a plurality of text samples exceed the threshold, one text sample having the highest degree of similarity may be selected or several text samples may be selected as candidates of a recognition result in descending order of degree of similarity. In this way, the speech recognition unit 224 acquires the knowledge representation of the user's intent represented by the input speech. Assume, for example, that an input speech of "Make two copies in full-color" is obtained. The speech recognition unit 224 correlates input text data of "Make two copies in full-color" with the intent list and the entity list. This input text data matches the utterance of "Make {NUMBER} {CopyOperation} in {ColorMode}" identified by an intent ID "Copy_with_2_settings". Corresponding entities are {NUMBER}=2, {ColorMode}=cm_00005 (full-color), {CopyOperation}=copy_00000 (copies). Therefore, the user's intent is recognized as a combination of an intent "Copy_with_2_settings", the first entity "2", the second entity "cm_00005", and the third entity "copy_00000". The speech recognition unit 224 generates intent data in which such recognition result is described. Note that "copies" and "replications" are associated with the entity ID "copy_00000" in the entity list, and thus even if an input speech is "Make two replications in full-color", the same recognition result can be acquired.

FIGS. 13A to 13C show some examples of the intent data that can be generated by the speech recognition unit 224. The intent data is data including a plurality of structured data fields. The first data filed of the intent data represents an intent into which the input speech is classified, and describes a filed name "Intent ID" and a separator ":", followed by the intent ID. The second data field of the intent data represents zero or one or more entities, and describes a field name "Entities" and a separator ":", followed by a list of pair(s) of entity ID and value ID. Intent data 231 includes an intent "Copy-simple" and one entity {CopyOperation}=copy_00000. This represents the user's intent to instruct the image processing apparatus 300 to simply make a copy. Intent data 232 includes an intent "Copy_with_noc" and two entities {Number}=2 and {CopyOperation}=copy_00000. This represents the user's intent to instruct the image processing apparatus 300 to make two copies. Intent data 233 includes an intent "Copy_with_4_settings" and six entities. Note that the structure of the intent data is not limited to those shown in FIGS. 13A to 13C. For example, the speech recognition unit 224 may include a plurality of candidates of a recognition result in the intent data. The speech recognition unit 224 may additionally include, in the intent data, the degree of similarity between a sample and an input calculated with respect to each intent or each entity.

(3) Image Processing Apparatus

Figure 7:
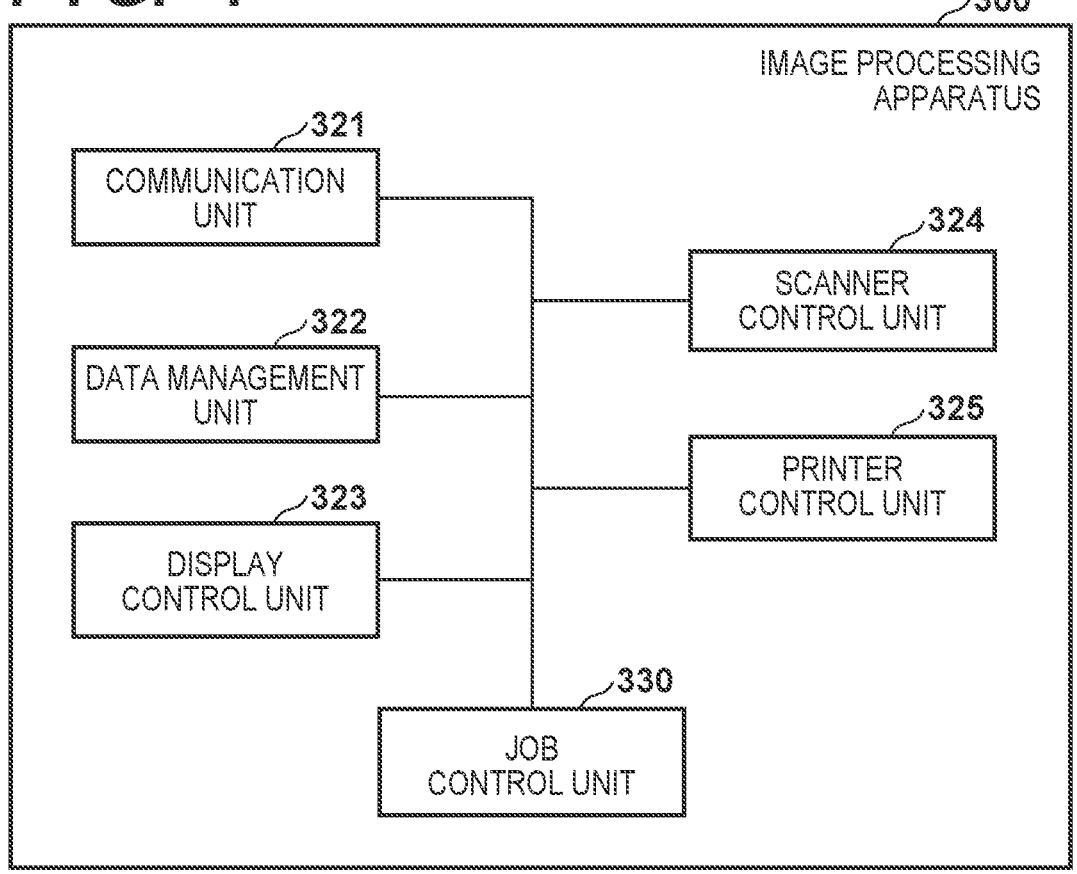
FIG. 7 is a block diagram showing an example of a functional arrangement of the image processing apparatus according to an embodiment.

FIG. 7 is a block diagram showing an example of a functional arrangement of the image processing apparatus 300 according to this embodiment. Referring to FIG. 7, the image processing apparatus 300 includes a communication unit 321, a data management unit 322, a display control unit 323, a scanner control unit 324, a printer control unit 325, and a job control unit 330. Each of these functional blocks can be realized by, for example, the CPU 311 of the image processing apparatus 300 executing a corresponding computer program in cooperation with other hardware.

The communication unit 321 transmits data to another apparatus connected to the network 20 and receives data from another apparatus via the network I/F 315. For example, the communication unit 321 receives the above-described intent data from the speech recognition server 200. The communication unit 321 transmits response text data to the speech recognition server 200. The communication unit 321 receives, from the client terminal 50, an instruction signal to instruct execution of a job. The communication unit 321 transmits read image data to the client terminal 50.

The data management unit 322 uses the secondary storage apparatus 314 to manage data necessary for image formation and reading of an original by the image processing apparatus 300. For example, the data management unit 322 manages setting data for settings of the image processing function of the image processing apparatus 300, job data for a job to be executed, and authentication information necessary for communication with the speech recognition server 200.

The display control unit 323 controls display of an image (for example, a UI image) by the operation panel 360 via the display controller 316. The display control unit 323 interprets contents of a user input indicated by an operation signal accepted from the operation panel 360 via the operation I/F 317, and assigns the user input to an appropriate functional block of the image processing apparatus 300. In response to a request from the job control unit 330, the display control unit 323 updates display contents of the operation panel 360.

Under the control of the job control unit 330, the scanner control unit 324 causes the scanner 380 to read an original via the scanner I/F 318, and outputs image data of the generated read image to the data management unit 322. Furthermore, the scanner control unit 324 acquires the operation status of the scanner 380 via the scanner I/F 318.

Under the control of the job control unit 330, the printer control unit 325 causes the printer 390 to form an image via the printer I/F 319. The printer control unit 325 acquires the operation status of the printer 390 via the printer I/F 319.

The job control unit 330 controls setting and execution of a job by the scanner 380 and the printer 390 while interacting with the user using the UI provided to the user by the speech control system 10. The UI provided to the user by the speech control system 10 can include a speech UI provided via the speech control apparatus 100 and a GUI provided via the operation panel 360 of the image processing apparatus 300. If, for example, execution of a job is instructed on the GUI, the job control unit 330 causes, in response to an operation signal input via the operation I/F 317, one or both of the scanner control unit 324 and the printer control unit 325 to start an operation corresponding to the instructed job. The job control unit 330 collects operation statuses of the scanner 380 and the printer 390 from the scanner control unit 324 and the printer control unit 325, and displays the operation statuses on the operation panel 360 via the display control unit 323.

Furthermore, if intent data is received from the speech recognition server 200, the job control unit 330 causes one or both of the scanner control unit 324 and the printer control unit 325 to start the operation corresponding to the instructed job in accordance with the user's intent indicated by the intent data. For example, in the intent list shown in FIGS. 8 and 9, an intent including the entity {CopyOperation} indicates that a copy job is to be executed. Similarly, an intent including both {ScanOperation} and {PrintOperation} indicates that a copy job is to be executed. An intent including the entity {PrintOperation} indicates that a print job is to be executed. An intent including the entity {ScanOperation} indicates that a reading job is to be executed. Note that a copy job can substantially be a combination of a print job and a reading job.

Each job includes zero or one or more setting items. The job control unit 330 specifies, based on entity IDs and value IDs described in the intent data, setting items to be set at the time of executing a job. The setting items are items represented by the input speech of the user acquired by the microphone 160 of the speech control apparatus 100. For example, if the intent data 231 shown in FIG. 13A is received, the user simply instructs execution of a copy job without designating any setting item. In this case, the job control unit 330 can output, to the scanner control unit 324 and the printer control unit 325, a copy job indicating that default settings (or the same settings as those in the previous execution) are to be used. Note that depending on the operation statuses of the scanner 380 and the printer 390, the job control unit 330 may hold or reject execution instead of instructing execution of a copy job. If the intent data 232 is received, the user instructs execution of a copy job by setting the number of copies to two. In this case, the job control unit 330 can output the copy job including one setting item of "Number=2" to the scanner control unit 324 and the printer control unit 325. If the intent data 233 is received, the user instructs execution of a copy job by setting five setting items of a color mode, a sheet surface, the number of copies, a position, and a post-process. In this case, the job control unit 330 can output the copy job including these five setting items to the scanner control unit 324 and the printer control unit 325.

In the above-described case of controlling the settings of the image processing unit using the speech UI, it is desirable to take a measure to prevent an operation error caused by a speech recognition error. To maintain natural interaction with the user, an attempt is normally made to prevent an operation error by including a speech recognition result in a response to the user. In this embodiment as well, the job control unit 330 generates, as a response to the reception of the intent data, response text data representing contents of a response speech to be read by the speech control apparatus 100, and returns the generated response text data to the speech recognition server 200.

However, the scanner 380 and the printer 390 include many setting items that can be designated by the user. When the number of designated setting items is small as in the cases of the intent data 231 and 232, even if a response speech that repeats all the recognized setting items is output, smooth interaction does not deteriorate. However, when the number of designated setting items is large as in the case of the intent data 233, if all the recognized setting items are repeated, a response is redundant, and smooth interaction deteriorates, thereby increasing a burden on the user. To cope with this, in this embodiment, the job control unit 330 determines whether one or more setting items specified from the intent data satisfy a given reading condition. Depending on the result of the determination, the job control unit 330 causes the speaker 170 of the speech control apparatus 100 to output a first response speech that reads the specified setting items or a second response speech that does not read at least one of the specified setting items. The reading condition is typically a condition for determining, using a feature amount related to the length of the response speech (for example, by comparing the feature amount with a threshold), whether the response speech becomes redundant if the specified setting items are read. If it is determined that the response speech does not become redundant, the job control unit 330 generates response text data for the first response speech; otherwise, the job control unit 330 generates response text data for the second response speech.

In the first example to be described later, the reading condition includes a condition based on comparison between a threshold and the number of setting items to be set in a job based on an input speech. In the second example, the reading condition includes a condition based on comparison between a threshold and the number of read words or the number of read letters when the specified setting items are read, or a condition based on comparison between a threshold and the duration of reading when the specified setting items are read. These examples will further be described later together with some drawings exemplifying a progress of interaction and a flow of a process.

When causing the speech control apparatus 100 to output the second response speech, the job control unit 330 may instruct the display control unit 323 to display, on the operation panel 360, a setting confirmation screen indicating one or more setting items specified from the intent data. In this case, the second response speech may include speech to request the user to check the setting confirmation screen. That is, if reading of at least one setting item is omitted to avoid the response speech from becoming redundant, the job control unit 330 requests the user to check whether there is no setting error using the GUI together with the speech UI in order to prevent execution of a job with a setting error. This makes it possible to perform both smooth interaction with the user via the speech UI and the correct operation of the multifunctional apparatus.

After the response text data is transmitted from the job control unit 330 to the speech recognition server 200, the response speech represented by the response text data is output from the speaker 170. The job control unit 330 awaits a user input (a speech input or an operation on the GUI) indicating a response of the user to the response speech. If a user input to instruct continuation of a job is detected (if such intent data is received or an operation signal is input), the job control unit 330 outputs a job including originally specified setting items to the image processing unit that is to process the job. On the other hand, if a user input to instruct correction of any setting item is detected, the job control unit 330 reflects the correction on the job, and starts to execute the job. If correction of the setting item is instructed via the speech UI, the job control unit 330 may return the response text data again to request the user to confirm the correction. If no user input is detected even after a predetermined period elapses, the job control unit 330 may output a job including the originally specified setting items to the image processing unit that is to process the job. Instead, if no user input is detected, the job control unit 330 may cancel execution of the job.

The job control unit 330 may transmit, to the speech recognition server 200 via the communication unit 321, session control information indicating whether to continue the speech interaction session together with the response text data. The job control unit 330 maintains, throughout one session, a control state (for example, a job status such as waiting for confirmation of setting items, and job parameters such as the intent ID, entity ID(s), and value ID(s)) of the corresponding job on the memory. The session can end at the end of execution of the job or at cancellation of the job.

2. Process Flow

2-1. Overall Flow

Figure 14:
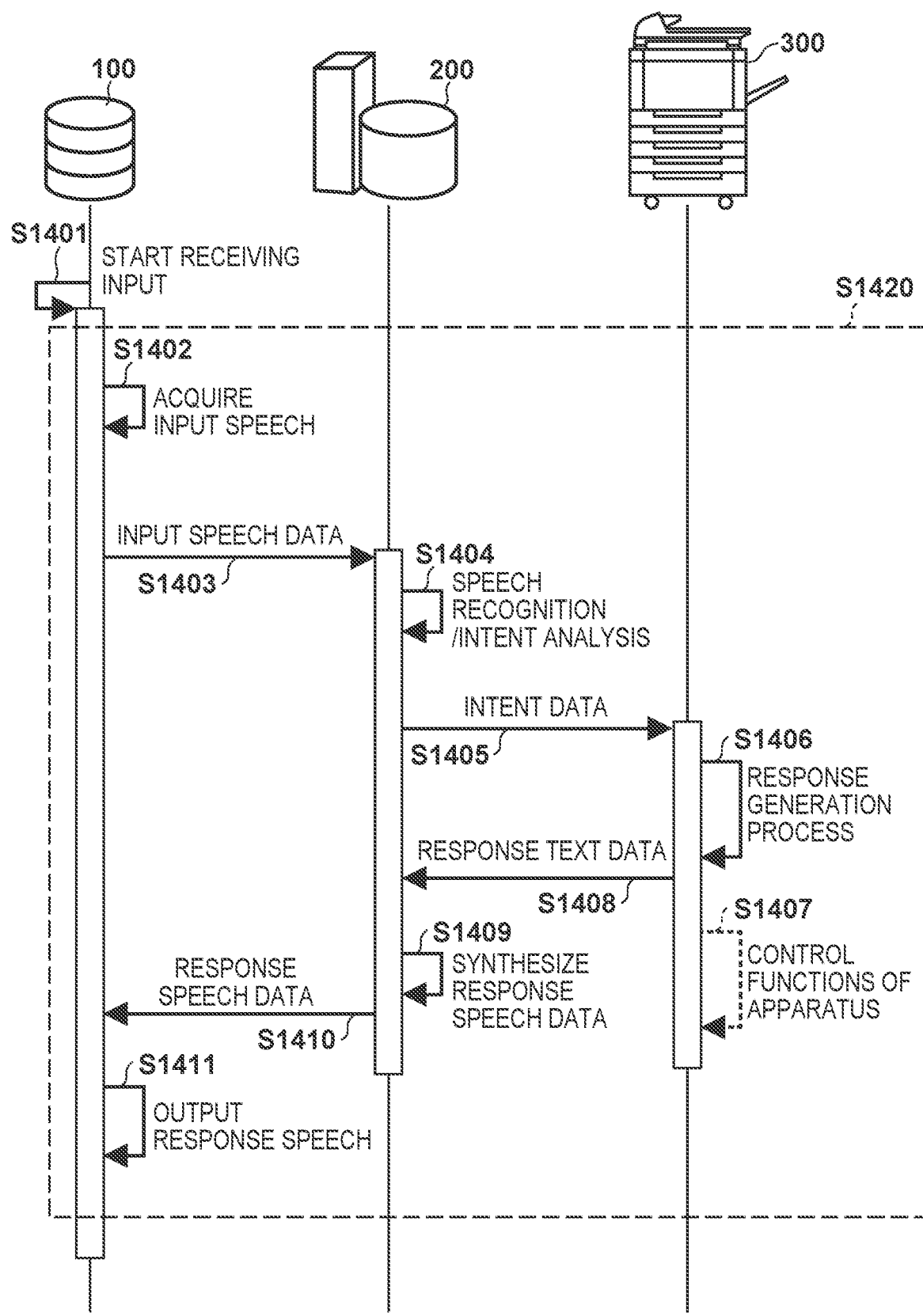
FIG. 14 is a sequence chart showing an overall flow of a speech control process according to an embodiment.

FIG. 14 is a sequence chart showing an example of an overall flow of a speech control process that may be executed in the speech control system 10 according to this embodiment. The speech control process is executed by the speech control apparatus 100, the speech recognition server 200, and the image processing apparatus 300. Note that in the following description, a process step is abbreviated to S (step).

In S1401, the speech control apparatus 100 starts receiving a speech input from a user. For example, in response to recognition of an utterance of the wake word by a user, the start detection unit 125 of the speech control apparatus 100 may output the control start signal to the speech control unit 130, thereby starting a speech interaction session.

In S1402, the microphone 160 of the speech control apparatus 100 acquires an input speech of the user. The speech acquisition unit 123 generates input speech data of the acquired input speech. Generation of the input speech data can be continued until the end determination unit 126 detects the end of the speech input.

In S1403, the speech control unit 130 transmits the input speech data generated in S1402 to the speech recognition server 200. Note that the speech control unit 130 may transmit a series of input speech data at one time after the end determination unit 126 detects the end of the speech input. Instead, the speech control unit 130 may sequentially transmit fragments of input speech data to the speech recognition server 200 without waiting for the end timing of the speech input. The speech recognition unit 224 of the speech recognition server 200 receives the input speech data via the communication unit 221.

In S1404, the speech recognition unit 224 executes speech recognition on the input speech data to convert the input speech data into input text data, and generates intent data based on the input text data.

In S1405, the speech recognition unit 224 transmits the intent data to the image processing apparatus 300 via the communication unit 221. The job control unit 330 of the image processing apparatus 300 receives the intent data via the communication unit 321.

In S1406, the job control unit 330 executes a response generation process for responding to the received intent data, thereby generating response text data. Some detailed examples of the response generation process executed here will further be described later. In S1407, the job control unit 330 controls one or both of the image forming function and the original reading function of the image processing apparatus 300 in accordance with the user's intent indicated by the intent data. Note that, as indicated by dotted lines in FIG. 14, S1407 is optional. That is, the control of functions of the image processing apparatus 300 does not necessarily be performed every time intent data is received, and may be performed once at the end of the speech interaction session, for example.

In S1408, the job control unit 330 transmits, to the speech recognition server 200 via the communication unit 321, the response text data generated by the response generation process. The speech synthesis unit 225 of the speech recognition server 200 receives the response text data via the communication unit 221. Note that in S1408, the job control unit 330 may transmit the session control information to the speech recognition server 200 together with the response text data, as described above.

In S1409, the speech synthesis unit 225 synthesizes a response speech that reads the received response text data, and generates response speech data representing the synthesized response speech. The generated response speech data can represent, for example, a response speech without omission (first response speech) that reads all of one or more setting items or a response speech with omission (second response speech) that does not read at least one setting item.

In S1410, the speech synthesis unit 225 transmits the generated response speech data to the speech control apparatus 100 via the communication unit 221. The speech control unit 130 of the speech control apparatus 100 receives the response speech data (together with the session control information) via the communication unit 121.

Next, in S1411, the speech control unit 130 causes the speech reproduction unit 127 to reproduce the response speech based on the received response speech data, thereby outputting the response speech from the speaker 170.

The interaction for one round trip indicated by S1420 in FIG. 14 can be repeatedly performed as long as the session control information indicates to continue the speech interaction session except that the user cancels interaction. If the session control information indicates that the speech interaction session is to be ended, the speech control unit 130 can end the speech interaction session to transition to the standby state. If the start detection unit 125 newly detects a wake word, a speech interaction session will start again.

2-2. First Example

As described above, in this embodiment, the job control unit 330 of the image processing apparatus 300 determines whether one or more setting items specified via the speech UI satisfy a given reading condition. The reading condition is a condition for deciding, when responding to the user, whether all the specified one or more setting items are to be read or reading of at least one setting item is to be omitted. The first example assumes that this reading condition includes a condition based on comparison between a threshold and the number of setting items to be set for the image processing unit based on an input speech.

Figure 15:
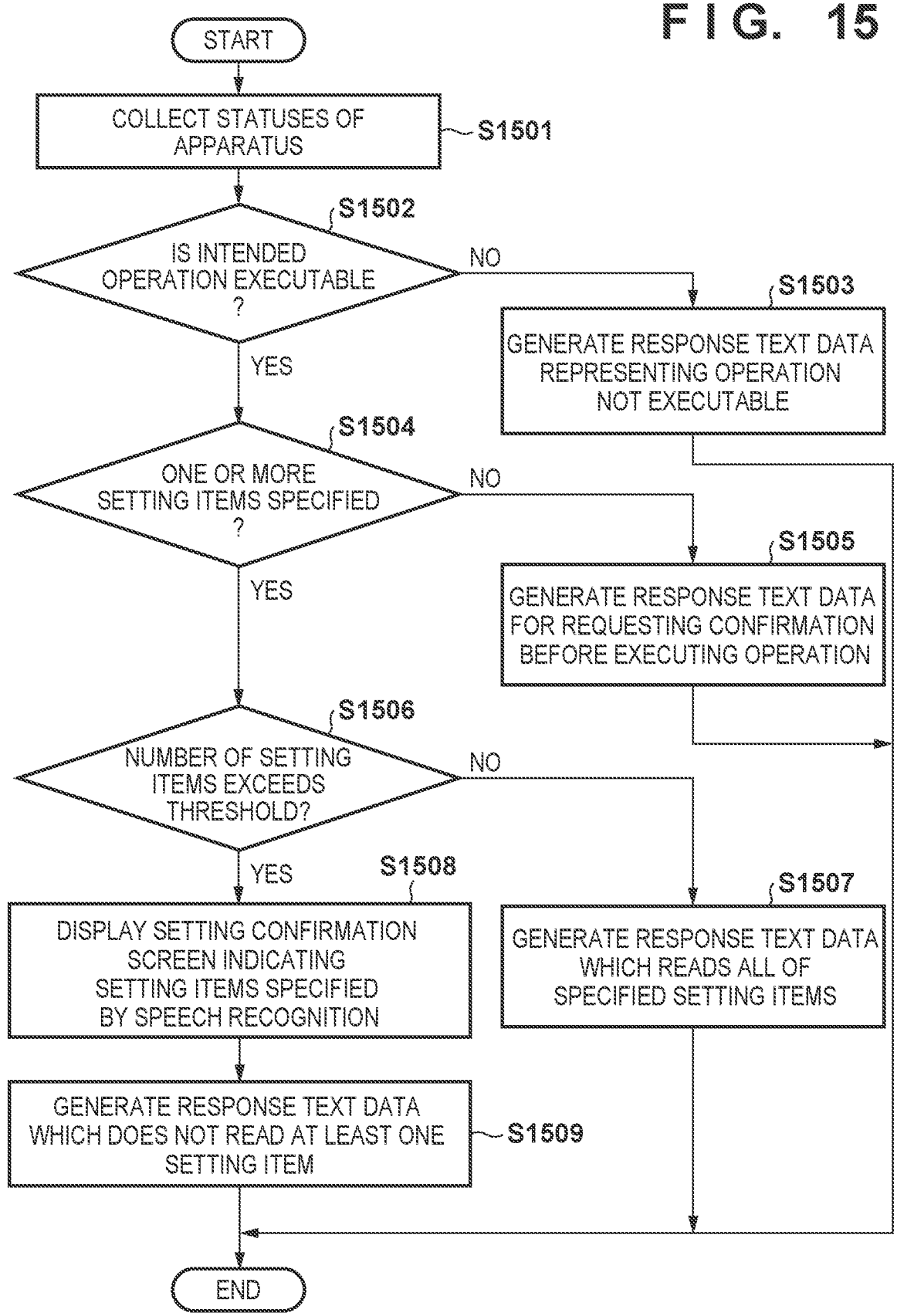
FIG. 15 is a flowchart illustrating an example of a detailed flow of a response generation process according to the first example.

FIG. 15 is a flowchart illustrating an example of a detailed flow of the response generation process according to the first example, which can be executed in S1406 of FIG. 14. The response generation process can be realized as a process of the job control unit 330 by, for example, the CPU 311 of the image processing apparatus 300 executing a computer program loaded into the RAM 312.

The job control unit 330 collects, in S1501, various statuses of the image processing apparatus 300 upon reception of the intent data from the speech recognition server 200 as a trigger in S1405 of FIG. 14. For example, the job control unit 330 can acquire the operation status of the scanner 380 from the scanner control unit 324, the operation status of the printer 390 from the printer control unit 325, and the display status of the operation panel 360 from the display control unit 323.

Next, in S1502, the job control unit 330 determines, based on the collected statuses, whether an operation intended by the user indicated by the intent data is executable. For example, if the printer cannot operate for some reason (for example, lack of consumable material such as a sheet, or an existence of an uncompleted preceding job) even though the intent data includes an intent ID associated with a print job, it can be determined that the intended operation is not executable. If it is determined that the operation intended by the user is not executable, the process advances to S1503; otherwise, the process advances to S1504.

In S1503, since the operation intended by the user is not executable, the job control unit 330 generates response text data for a response speech representing a situation that the operation is not executable. If, for example, it is intended to execute a copy job but the copy job is not executable, response text data of "Unable to execute copy job, presently" can be generated. Note that the generated response text data may include speech that reads the reason why the operation is not executable.

Meanwhile, in S1504, since the operation intended by the user is executable, the job control unit 330 determines, based on the intent data, whether one or more setting items are designated by the user. The number of designated setting items may be, for example, the number of entity IDs predefined as representing setting items among entity IDs included in the intent data. For example, in the example of the intent data 232, the entity ID "NUMBER" is predefined as representing a setting item, and it can be determined that the number of setting items is one. In the example of the intent data 233, it can be determined that the number of setting items is five. On the other hand, in the example of the intent data 231, the entity ID "CopyOperaton" is not predefined as representing a setting item, and it can thus be determined that the number of setting items is zero. Note that an item representing a type of job such as "CopyOperation" may also be counted as one setting item. If it is determined that no setting item is designated, the process advances to S1505. Meanwhile, if it is determined that one or more setting items are designated by the user, the process advances to S1506.

In S1505, since no setting item is designated by the user, the job control unit 330 generates response text data for a response speech that requests the user to perform confirmation before execution of the operation (the operation specified based on the intent ID) intended by the user. For example, if it is intended to execute a copy job, and no setting item is designated, response text data of "Default settings are used to make a copy" can be generated.

Meanwhile, in S1506, the job control unit 330 determines whether the number of setting items specified from the intent data exceeds the threshold. In this example, assume that the threshold used for determination of the reading condition is, but not limited to, two. In this case, in the case of the intent data 232, since the number of setting items is one, and is smaller than the threshold, the job control unit 330 can determine that the reading condition is not satisfied. To the contrary, in the case of the intent data 233, since the number of setting items is five and exceeds the threshold, the job control unit 330 can determine that the reading condition is satisfied. If it is determined that the number of setting items does not exceed the threshold, the process advances to S1507; otherwise, the process advances to S1508.

In S1507, the job control unit 330 generates response text data for a response speech that reads all the setting items specified from the intent data. For example, in the case of the intent data 232, response text data of "Is it OK to make three copies?" can be generated.

Meanwhile, in S1508, the job control unit 330 displays, on the operation panel 360 via the display control unit 323, a setting confirmation screen indicating the setting items (for example, all the setting items) specified from the intent data. The displayed setting confirmation screen can be, for example, a screen in which pairs of the names and values of the setting items are listed. In S1509, the job control unit 330 generates response text data for a response speech that does not read at least one setting item. In this example, for example, response text data of "See the operation panel. Is it OK to execute copy with these settings?" can be generated.

The job control unit 330 transmits the response text data generated in S1503, S1505, S1507, or S1509 described above to the speech recognition server 200 in S1408 of FIG. 14.

Figure 16:
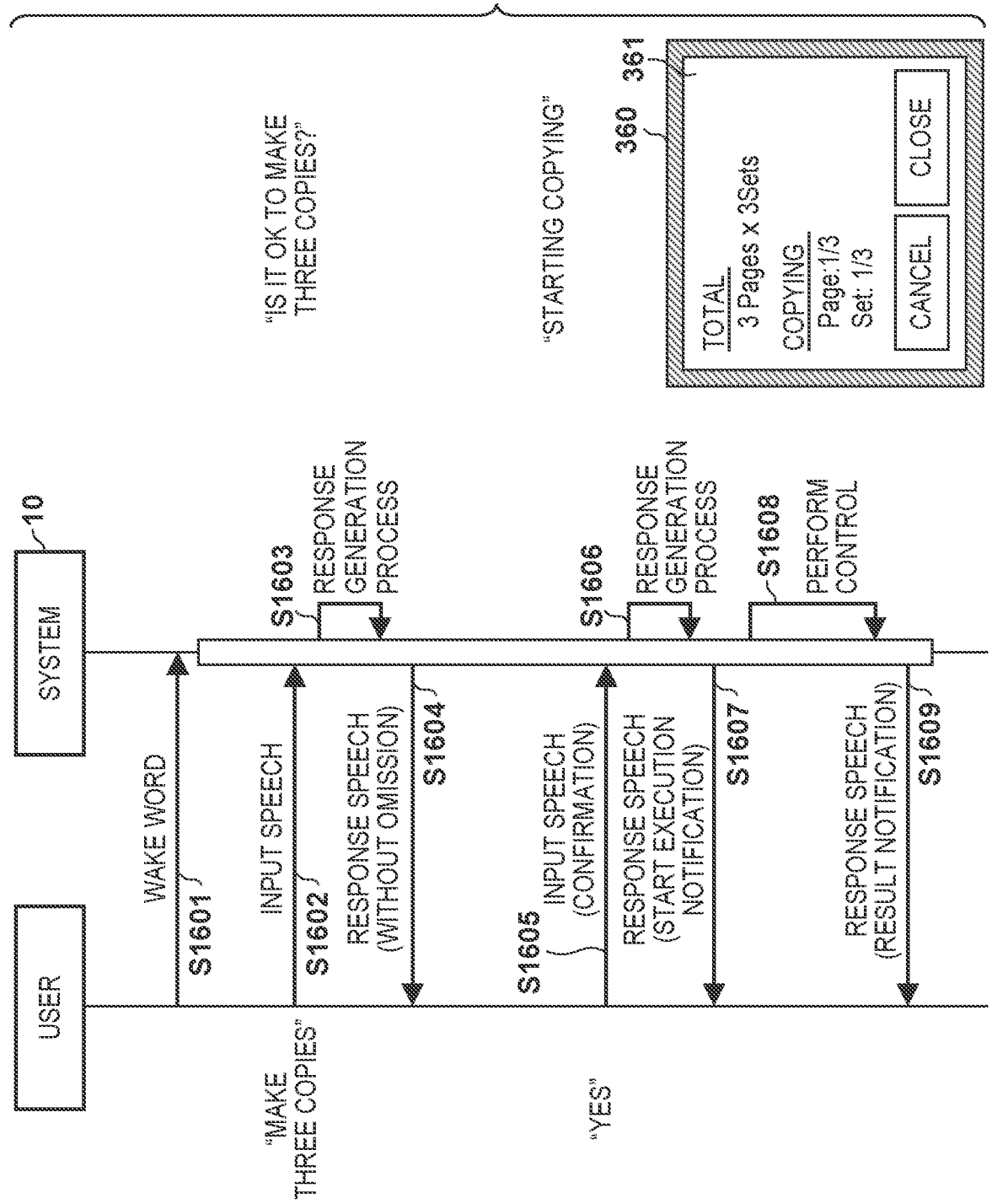
FIG. 16 is a sequence chart showing an example of interaction between a system and a user according to the first example together with a sample of a GUI.
Figure 17:
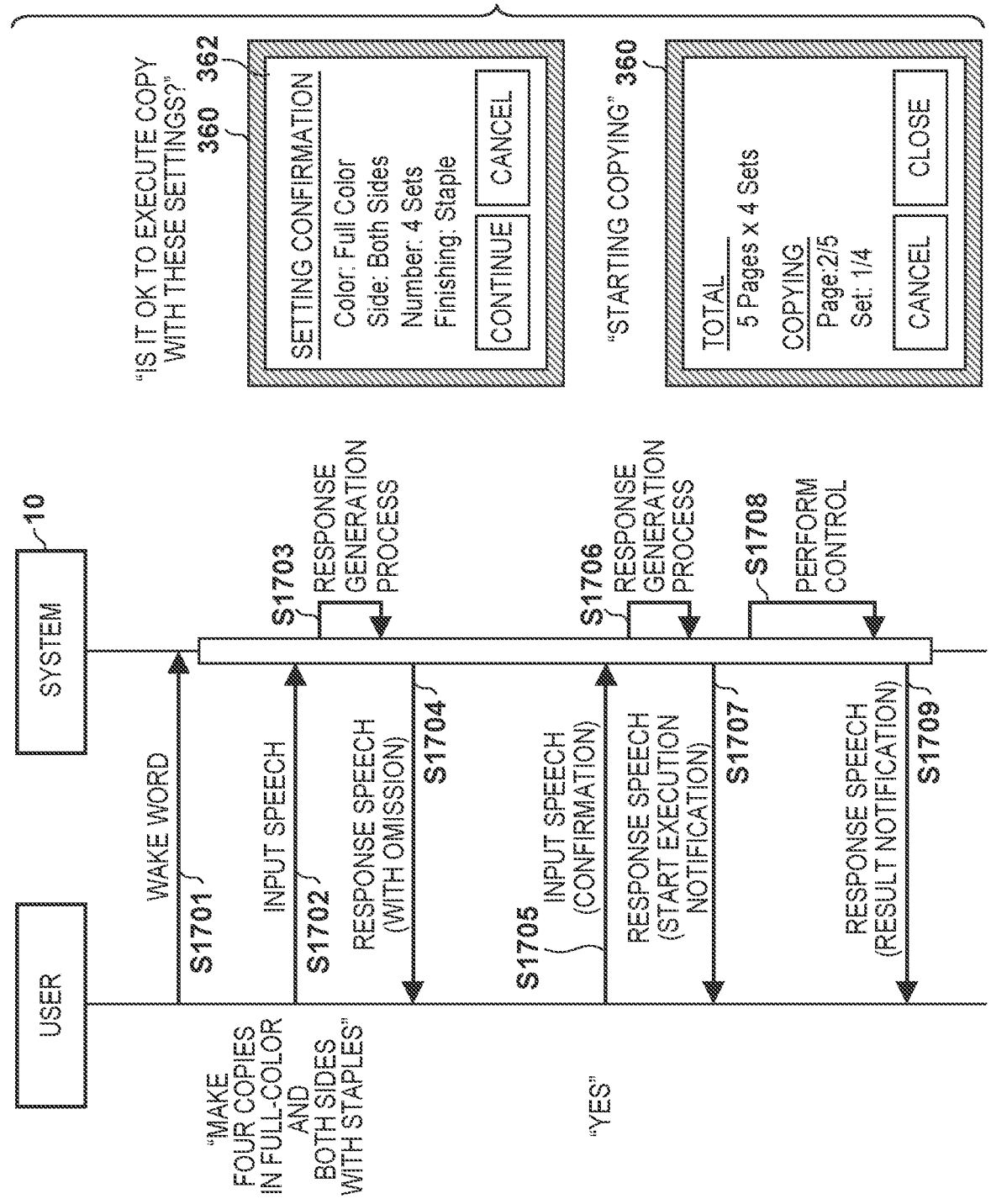
FIG. 17 is a sequence chart showing another example of interaction between the system and the user according to the first example together with a sample of the GUI.

FIGS. 16 and 17 are sequence charts each showing an example of interaction between the system and the user according to this example together with a sample of the GUI. In a scenario shown in FIG. 16, since the user designates, by an input speech, only a smaller number of setting items than the threshold, a response speech that reads all the specified setting items is output as a speech recognition result. The GUI for confirmation of the setting items is not displayed along with the output of the response speech. To the contrary, in a scenario shown in FIG. 17, since the user designates, by an input speech, a larger number of setting items than the threshold, a response speech that omits reading of a specified setting item is output as a speech recognition result. The GUI for confirmation of the setting items is displayed along with the output of the response speech.

In the scenario shown in FIG. 16, in S1601, the user utters the wake word to the speech control apparatus 100, and a speech interaction session starts upon detection of the wake word as a trigger. Following the wake word, the user utters, in S1602, speech of "Make three copies" representing contents of an operation to be desirably executed by the image processing apparatus 300. This speech is acquired as an input speech by the microphone 160 of the speech control apparatus 100, and undergoes speech recognition by the speech recognition server 200, and then intent data indicating a speech recognition result is provided to the image processing apparatus 300.

In S1603, in accordance with the user's intent indicated by the received intent data, the job control unit 330 of the image processing apparatus 300 executes the response generation process described with reference to FIG. 15. In this example, since the number of setting items specified from the intent data does not exceed the threshold (for example, two), the job control unit 330 generates response text data for a response speech without omission. For example, the response text data indicates contents of a response speech of "Is it OK to make three copies?". In S1604, the speech control apparatus 100 outputs the response speech without omission from the speaker 170 using response speech data synthesized based on the response text data. After the output of the response speech, the speech interaction session is continued. Furthermore, the job control unit 330 temporarily holds the values of the setting items of an unexecuted job.

Next, in S1605, the user who listens to the response speech utters speech of "Yes" to notify the system that there is no error in setting items which need to be confirmed. This speech is also acquired as an input speech by the microphone 160, and undergoes speech recognition by the speech recognition server 200, and then intent data indicating a speech recognition result is provided to the image processing apparatus 300.

In S1606, since it has been confirmed that there is no error in setting items, the job control unit 330 starts to execute the copy job. At this time, to notify the user of the start of execution of the designated job, the job control unit 330 generates, for example, response text data indicating contents of a response speech of "Starting copying". In S1607, the response speech of the contents indicated by the response text data is output from the speaker 170.

Furthermore, in S1608, the job control unit 330 executes control as desired by the user by setting the values of the temporarily held setting items in the copy job and outputting the copy job to the corresponding image processing unit. S1608 may be executed in parallel to S1607. Furthermore, the job control unit 330 displays, on the operation panel 360, an execution status screen 361 indicating the execution status of the job. The display contents of the execution status screen 361 can be updated, where appropriate, along with the progress of the job.

After that, if the execution of the copy job in the image processing apparatus 300 ends, the job control unit 330 generates, for example, response text data indicating contents of a response speech of "Finished copy execution" in order to notify the user of the end of the execution of the job. In S1609, the response speech of the contents indicated by the response text data is output from the speaker 170.

In the scenario shown in FIG. 17 as well, in S1701, the user utters the wake word to the speech control apparatus 100, and a speech interaction session starts upon detection of the wake word as a trigger. Following the wake word, the user utters, in S1702, speech of "Make four copies in full-color and both sides with staples" representing contents of an operation to be desirably executed by the image processing apparatus 300. This speech is acquired as an input speech by the microphone 160 of the speech control apparatus 100, and undergoes speech recognition by the speech recognition server 200, and then intent data indicating a speech recognition result is provided to the image processing apparatus 300.

In S1703, in accordance with the user's intent indicated by the received intent data, the job control unit 330 of the image processing apparatus 300 executes the response generation process described with reference to FIG. 15. In this example, since the number of setting items specified from the intent data exceeds the threshold, the job control unit 330 generates response text data for a response speech with omission. For example, the response text data indicates contents of a response speech of "Is it OK to execute copy with these settings?". In S1704, the speech control apparatus 100 outputs the response speech with omission from the speaker 170 using response speech data synthesized based on the response text data. The job control unit 330 displays a setting confirmation screen 362 on the operation panel 360 along with the output of the response speech. In the example shown in FIG. 17, in the setting confirmation screen 362, the names and values of four setting items specified from the intent data are listed. The response speech output in S1704 may include speech that requests the user to check the setting confirmation screen 362. After the output of the response speech, the speech interaction session is continued. Furthermore, the job control unit 330 temporarily holds the values of the setting items of an unexecuted job.

Next, in S1705, the user who listens to the response speech utters speech of "Yes" to notify the system that there is no error in setting items which need to be confirmed. This speech is also acquired as an input speech by the microphone 160, and undergoes speech recognition by the speech recognition server 200, and then intent data indicating a speech recognition result is provided to the image processing apparatus 300. Note that the user may notify the system that there is no error in setting items by operating the setting confirmation screen 362 (for example, by touching a "Continue" button), instead of uttering in S1705.

In S1706, since it is confirmed that there is no error in setting items, the job control unit 330 generates response text data for notifying the user of the start of execution of the copy job. Interaction in S1707 to S1709 after that may be similar to those in S1607 to S1609 described with reference to FIG. 16, and descriptions thereof are thus omitted.

2-3. Second Example

The second example assumes that the reading condition for deciding whether to omit reading of at least one setting item includes a condition based on comparison between a threshold and the number of read words or the number of read letters when reading specified setting items, or comparison between a threshold and the duration of reading. The number of read words and the number of read letters can be counted from response text data. The duration of reading may be estimated from response text data or measured from response speech data.

Figure 18:
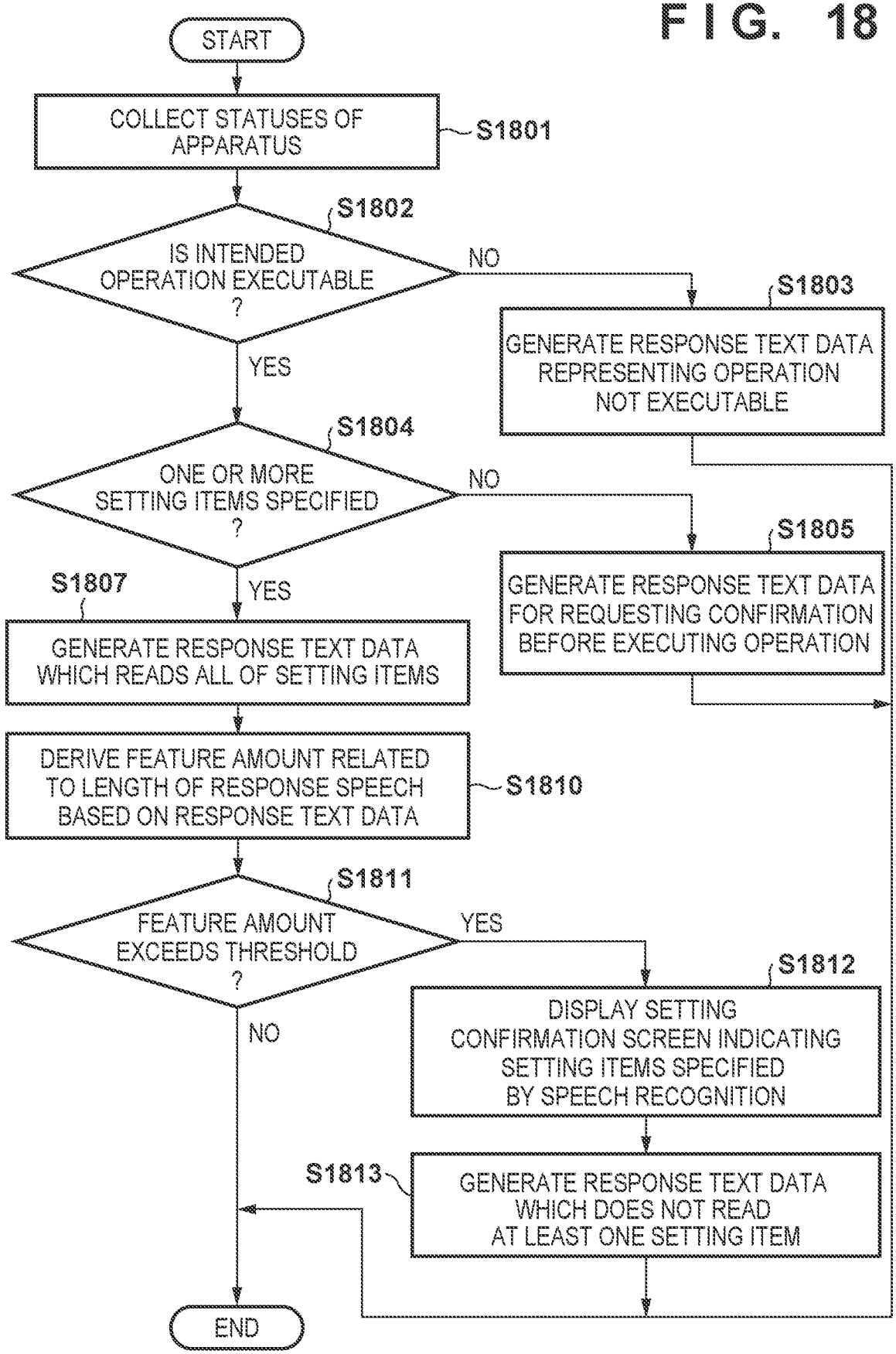
FIG. 18 is a flowchart illustrating an example of a detailed flow of a response generation process according to the second example.

FIG. 18 is a flowchart illustrating an example of the detailed flow of the response generation process according to the second example, which can be executed in S1406 of FIG. 14. The response generation process can be realized as a process of the job control unit 330 by, for example, the CPU 311 of the image processing apparatus 300 executing a computer program loaded into the RAM 312.

S1801 to S1805 of FIG. 18 may be similar to S1501 to S1505 described with reference to FIG. 15 and descriptions thereof are thus omitted.

If it is determined in S1804 that the user designates one or more setting items, the job control unit 330 generates, in S1807, response text data for a response speech that reads all the setting items specified from the intent data.

In S1810, the job control unit 330 derives, based on the response text data generated in S1807, a feature amount related to the length of the response speech when reading the specified setting items. For example, the job control unit 330 may count, as the number of read words, the number of words included in the response text data. Alternatively, the job control unit 330 may count, as the number of read letters, the number of letters included in the response text data. In a case where specific types of characters/letters such as kanji and numerals are included in the response text data, the job control unit 330 may count the number of letters after converting the characters/letters into basic letters (for example, alphabets or kana) for speech. Alternatively, the job control unit 330 may estimate the duration of reading from contents of the response text data.

Next, in S1811, the job control unit 330 determines whether the feature amount derived in S1810 exceeds the threshold. For example, the threshold to be compared with the number of read Japanese letters may be, but not limited to, thirty. If it is determined that the feature amount related to the length of the response speech does not exceed the threshold, the response text data for the response speech without omission generated in S1807 is used to respond to the user, and the response generation process shown in FIG. 18 ends. Meanwhile, if it is determined that the feature amount exceeds the threshold, the process advances to S1812.

In S1812, the job control unit 330 displays, on the operation panel 360 via the display control unit 323, a setting confirmation screen indicating the setting items (for example, all the setting items) specified from the intent data. The displayed setting confirmation screen can be, for example, a screen in which pairs of the names and values of the setting items are listed. Furthermore, in S1813, the job control unit 330 generates response text data for a response speech that does not read at least one setting item. In this case, instead of the response text data without omission generated in S1807, the response text data with omission generated in S1813 is used to respond to the user.

The job control unit 330 transmits the response text data generated in S1803, S1805, S1807, or S1813 described above to the speech recognition server 200 in S1408 of FIG. 14.

Figure 19:
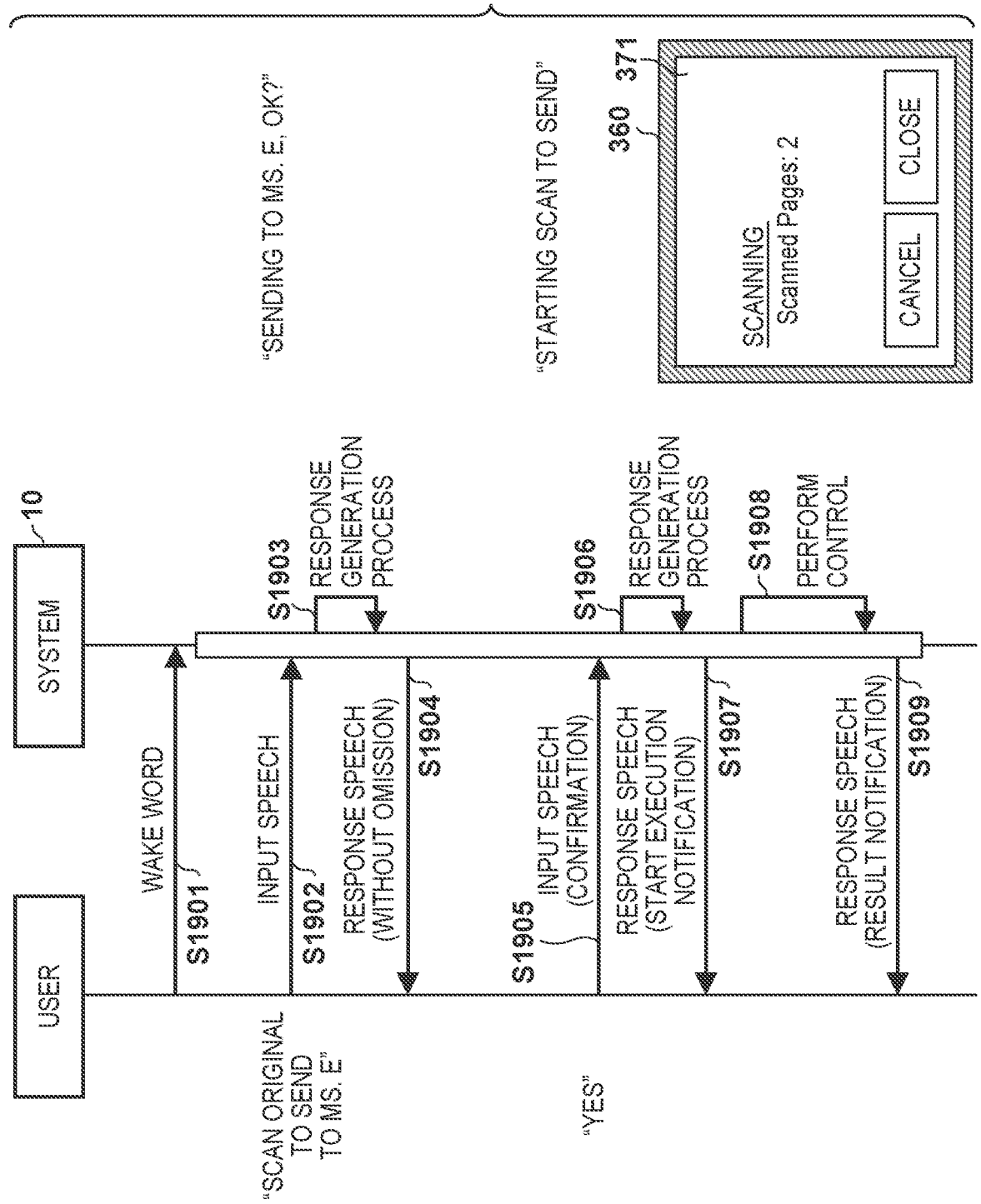
FIG. 19 is a sequence chart showing an example of interaction between the system and the user according to the second example together with a sample of the GUI.
Figure 20:
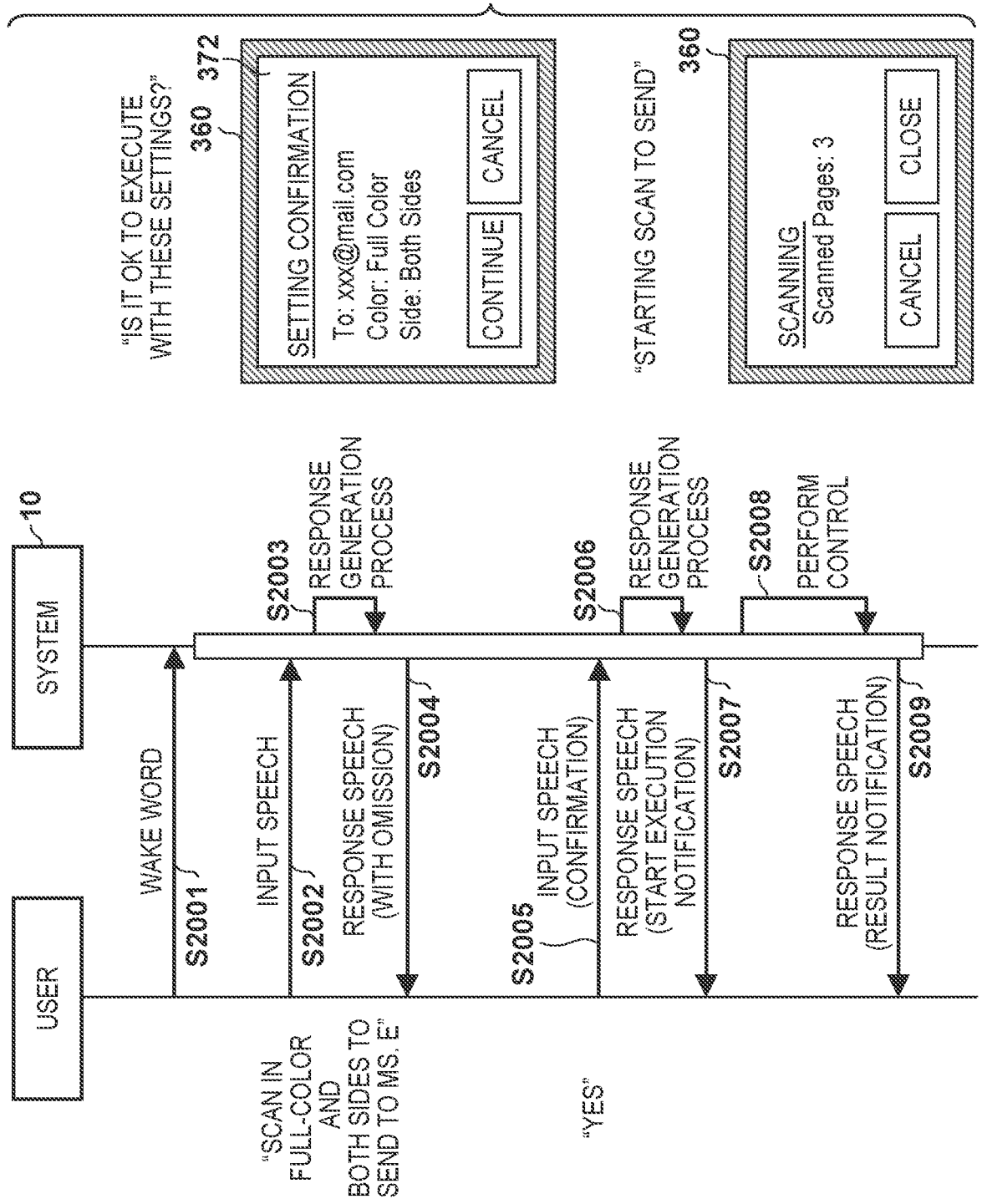
FIG. 20 is a sequence chart showing another example of interaction between the system and the user according to the second example together with a sample of the GUI.

FIGS. 19 and 20 are sequence charts each showing an example of interaction between the system and the user according to this example together with a sample of the GUI. In a scenario shown in FIG. 19, since the feature amount related to the length of the response speech when reading setting items specified as a speech recognition result does not exceed the threshold, a response speech that reads all the setting items is output. The GUI for confirmation of the setting items is not displayed along with the output of the response speech. To the contrary, in a scenario shown in FIG. 20, since the feature amount related to the length of the response speech when reading the setting items specified as a speech recognition result exceeds the threshold, a response speech that omits reading of at least one setting item is output. The GUI for confirmation of the setting items is displayed along with the output of the response speech.

In the scenario shown in FIG. 19, in S1901, the user utters the wake word to the speech control apparatus 100, and a speech interaction session starts upon detection of the wake word as a trigger. Following the wake word, the user utters, in S1902, speech of "Scan original to send to Ms. E" representing contents of an operation to be desirably executed by the image processing apparatus 300. This speech is acquired as an input speech by the microphone 160 of the speech control apparatus 100, and undergoes speech recognition by the speech recognition server 200, and then intent data indicating a speech recognition result is provided to the image processing apparatus 300.

In S1903, in accordance with the user's intent indicated by the received intent data, the job control unit 330 of the image processing apparatus 300 executes the response generation process described with reference to FIG. 18. In this example, since the number of letters after converting the response text data into basic letters does not exceed the threshold (for example, thirty), the job control unit 330 generates response text data for a response speech without omission. For example, the response text data indicates contents of a response speech of "Sending to Ms. E, OK?".

In S1904, the speech control apparatus 100 outputs the response speech without omission from the speaker 170 using response speech data synthesized based on the response text data. After the output of the response speech, the speech interaction session is continued. Furthermore, the job control unit 330 temporarily holds the values of the setting items of an unexecuted job.

Next, in S1905, the user who listens to the response speech utters speech of "Yes" to notify the system that there is no error in setting items which need to be confirmed. This speech is also acquired as an input speech by the microphone 160, and undergoes speech recognition by the speech recognition server 200, and then intent data indicating a speech recognition result is provided to the image processing apparatus 300.

In S1906, since it is confirmed that there is no error in setting items, the job control unit 330 starts to execute the reading job. At this time, to notify the user of the start of execution of the designated job, the job control unit 330 generates, for example, response text data indicating contents of a response speech of "Starting scan to send". In S1907, the response speech of the contents indicated by the response text data is output from the speaker 170.

Furthermore, in S1908, the job control unit 330 executes control as desired by the user by setting the values of the temporarily held setting items in the scan job and outputting the scan job to the corresponding image processing unit. S1908 may be executed in parallel to S1907. Furthermore, the job control unit 330 displays, on the operation panel 360, an execution status screen 371 indicating the execution status of the job. The display contents of the execution status screen 371 can be updated, as appropriate, along with the progress of the job.

After that, if execution of the scan job in the image processing apparatus 300 ends, the job control unit 330 generates, for example, response text data indicating contents of a response speech of "Finished sending" in order to notify the user of the end of the execution of the job. In S1909, the response speech of the contents indicated by the response text data is output from the speaker 170.

In the scenario shown in FIG. 20 as well, in S2001, the user utters the wake word to the speech control apparatus 100, and a speech interaction session starts upon detection of the wake word as a trigger. Following the wake word, the user utters, in S2002, speech of "Scan in full-color and both sides to send to Ms. E" representing contents of an operation to be desirably executed by the image processing apparatus 300. This speech is acquired as an input speech by the microphone 160 of the speech control apparatus 100, and undergoes speech recognition by the speech recognition server 200, and then intent data indicating a speech recognition result is provided to the image processing apparatus 300.

In S2003, in accordance with the user's intent indicated by the received intent data, the job control unit 330 of the image processing apparatus 300 executes the response generation process described with reference to FIG. 18. In this example, since the number of letters after converting the response text data into basic letters when reading all the setting items exceeds the threshold, the job control unit 330 generates response text data for a response speech with omission. For example, the response text data indicates contents of a response speech of "Is it OK to execute with these settings?". In S2004, the speech control apparatus 100 outputs the response speech with omission from the speaker 170 using response speech data synthesized based on the response text data. The job control unit 330 displays a setting confirmation screen 372 on the operation panel 360 along with the output of the response speech. In the example shown in FIG. 20, in the setting confirmation screen 372, the names and values of three setting items specified from the intent data are listed. The response speech output in S2004 may include speech that requests the user to check the setting confirmation screen 372. After the output of the response speech, the speech interaction session is continued.

Furthermore, the job control unit 330 temporarily holds the values of the setting items of an unexecuted job.

Next, in S2005, the user who listens to the response speech utters speech of "Yes" to notify the system that there is no error in setting items which need to be confirmed. This speech is also acquired as an input speech by the microphone 160, and undergoes speech recognition by the speech recognition server 200, and then intent data indicating a speech recognition result is provided to the image processing apparatus 300. Note that the user may notify the system that there is no error in setting items by operating the setting confirmation screen 372, instead of uttering in S2005.

In S2006, since it is confirmed that there is no error in setting items, the job control unit 330 generates response text data for notifying the user of the start of execution of the scan job. Interaction in S2007 to S2009 after that may be similar to those in S1907 to S1909 described with reference to FIG. 19, and descriptions thereof are thus omitted.

3. Modifications

The present invention is not limited to the above-described embodiments, and various modifications can be made. In one modification, the threshold used to determine the reading condition may be a variable value designated by the user. An intent representing an intention to designate the threshold may be defined in the intent list. By allowing the user to designate the threshold, the system can change the behavior of the speech UI in accordance with the preference of the user concerning the degree of redundancy of a response speech acceptable in speech interaction.

In another modification, the job control unit 330 may generate response text data to include speech that reads specific setting items in a response speech with omission. That is, even in the response speech with omission, some setting items may be read. The specific setting items may be predefined in a fixed manner as those that must be confirmed by the user, or may be designated by the user as those that are desirably, preferentially confirmed by the user. For example, when transmitting read image data to a designated destination, the recognized destination may always be read in order to reduce the risk of information leakage caused by an error in destination.

In still another modification, depending on a value of a setting item recognized as a speech recognition result, the job control unit 330 may change whether to read each setting item. For example, in a case where a recognized value with respect to the number of copies is large, a number of sheets may be wasted if the recognition is incorrect. To cope with this, if the recognized value of the number of copies exceeds a given threshold, the job control unit 330 may generate response text data so that a response speech with omission reads that value.

It should be noted that the above-described embodiments and modifications may be realized in any combination. For example, a mixed reading condition may be adopted such that all the setting items are read when the number of setting items is equal to or smaller than the first threshold and the number of read letters is equal to or smaller than the second threshold.

Two or more apparatuses that have been described as physically separate apparatuses in this specification may be combined in any fashion. A plurality of functions described as those of a single apparatus may be distributed to physically separate apparatuses. For example, the speech recognition function and speech synthesis function of the speech recognition server 200 may be integrated in the speech control apparatus 100 or the image processing apparatus 300. Furthermore, a function of omitting reading of a setting item in a response speech based on determination of the reading condition may be integrated in the speech control apparatus 100 or the speech recognition server 200. The image processing apparatus 300 may have the speech control function of the speech control apparatus 100 together with the microphone and the speaker.

4. Summary

The embodiments of the present disclosure have been described above in detail with reference to FIGS. 1 to 20. In the above-described embodiments, when controlling settings of an image processing unit in cooperation with a microphone and a speaker, a response speech is switched in accordance with whether one or more setting items represented by an input speech of a user satisfy a reading condition. The first response speech is speech that reads the one or more setting items, and the second response speech is speech that does not read at least one of the one or more setting items. With this arrangement, if the number of setting items specified based on the input speech of the user is large, it is possible to avoid the response from becoming redundant by not repeating many setting items in the response to the user. Thus, since the user is not forced to listen to reading of many setting items, a burden on the user is mitigated.

Furthermore, in the above-described embodiments, the reading condition includes a condition based on comparison between a threshold and a feature amount related to the length of the response speech when reading the one or more setting items. With this arrangement, if it is expected that the response speech is not long, it is possible to reliably prevent an operation error caused by a speech recognition error by reading all the specified setting items. On the other hand, if it is expected that the response speech is long, it is possible to omit reading of at least one setting item. The feature amount may represent the number of setting items. In this case, it is possible to switch the response speech by judging the reading condition directly from the number of setting items specified as a speech recognition result. The feature amount may represent the number of read words or the number of read letters when reading the one or more setting items. In this case, it is possible to judge the reading condition from the response text data without synthesizing the response speech. The feature amount may represent the duration of reading when reading the one or more setting items. In this case, it is possible to ensure that the duration of the response speech from the system becomes shorter than a certain duration.

In the above-described embodiments, if the second response speech is output, the setting confirmation screen indicating the one or more setting items to be set for the image processing unit may be displayed on a display device. With this arrangement, when reading of at least one setting item in the response speech is omitted, it is possible to make the user confirm, via the setting confirmation screen, whether the speech recognition result includes no error with respect to the setting items. By using both the speech UI and the GUI, it is possible to effectively mitigate the burden on the user while maintaining smooth interaction with the user. The above-described second response speech may also include speech that requests the user to check the setting confirmation screen. This can reliably attract the user's attention to confirmation of the speech recognition result on the GUI.

Note that the first response speech does not necessarily need to read all the setting items included in the speech recognition result. That is, the idea of the present invention may be extended to a general case in which the number of setting items read by the second response speech is smaller than that of setting items read by the first response speech.

5. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-206353, filed on Nov. 14, 2019 which is hereby incorporated by reference herein in its entirety.

What is claimed is:

1. A speech control system comprising:
a microphone configured to acquire speech;
a speaker configured to output speech;
an image processing unit; and
a controller configured to control settings of the image processing unit;
wherein the controller is configured to:
specify one or more setting items represented by an input speech of a user acquired by the microphone that are to be set for the image processing unit, and
depending on whether or not the specified one or more setting items satisfy a reading condition, cause the speaker to output a first response speech that reads the one or more setting items, or a second response speech that does not read at least one out of the one or more setting items.

2. The speech control system according to claim 1, wherein the reading condition includes a condition based on comparison between a feature amount related to a length of a response speech in a case of reading the one or more setting items and a threshold.

3. The speech control system according to claim 2, wherein the feature amount represents the number of the setting items.

4. The speech control system according to claim 2, wherein the feature amount represents the number of read words or the number of read letters in a case of reading the one or more setting items.

5. The speech control system according to claim 2, wherein the feature amount represents duration of reading in a case of reading the one or more setting items.

6. The speech control system according to claim 2, wherein the threshold is a variable value designated by a user.

7. The speech control system according to claim 1, further comprising a display device,
wherein when causing the speaker to output the second response speech, the controller causes the display device to display a setting confirmation screen indicating the one or more setting items that are to be set for the image processing unit.

8. The speech control system according to claim 7, wherein the controller includes, in the second response speech, speech to request a user to check the setting confirmation screen.

9. The speech control system according to claim 1, wherein the controller includes, in the second response speech, speech that reads a specific setting item.

10. The speech control system according to claim 1, wherein the image processing unit has at least one of an image forming function of forming an image on a sheet and an original reading function of reading an original to generate image data.

11. A speech control method of controlling settings of an image processing unit in cooperation with a microphone configured to acquire speech and a speaker configured to output speech, comprising:
specifying one or more setting items represented by an input speech of a user acquired by the microphone that are to be set for the image processing unit; and
causing, depending on whether or not the specified one or more setting items satisfy a reading condition, the speaker to output a first response speech that reads the one or more setting items, or a second response speech that does not read at least one out of the one or more setting items.

12. An image processing apparatus comprising:
an image processing unit; and
a controller configured to control settings of the image processing unit,
wherein the controller is configured to
specify one or more setting items represented by an input speech of a user acquired by a microphone that are to be set for the image processing unit, and
depending on whether or not the specified one or more setting items satisfy a reading condition, cause a speaker to output a first response speech that reads the one or more setting items, or a second response speech that does not read at least one out of the one or more setting items.

13. A non-transitory computer-readable storage medium storing a computer program for causing a processor of an image processing apparatus including an image processing unit to operate as a controller configured to control settings of the image processing unit,
wherein the controller is configured to
specify one or more setting items represented by an input speech of a user acquired by a microphone that are to be set for the image processing unit, and
depending on whether or not the specified one or more setting items satisfy a reading condition, cause a speaker to output a first response speech that reads the one or more setting items, or a second response speech that does not read at least one out of the one or more setting items.

14. A speech control apparatus comprising:
a microphone configured to acquire speech;
a speaker configured to output speech;
a communication interface configured to communicate with an image processing apparatus including an image processing unit; and
a controller configured to control acquisition of an input speech of a user by the microphone and output of a response speech to the input speech from the speaker,
wherein the controller is configured to, depending on whether or not one or more setting items that are specified based on the input speech acquired by the microphone and are to be set for the image processing unit by the image processing apparatus satisfy a reading condition, cause the speaker to output a first response speech that reads the one or more setting items, or a second response speech that does not read at least one out of the one or more setting items.

15. A non-transitory computer-readable storage medium storing a computer program for causing a processor, of a speech control apparatus including a microphone configured to acquire speech, a speaker configured to output speech, and a communication interface configured to communicate with an image processing apparatus including an image processing unit, to operate as a controller configured to control acquisition of an input speech of a user by the microphone and output of a response speech to the input speech from the speaker,
wherein the controller is configured to, depending on whether or not one or more setting items that are specified based on the input speech acquired by the microphone and are to be set for the image processing unit by the image processing apparatus satisfy a reading condition, cause the speaker to output a first response speech that reads the one or more setting items, or a second response speech that does not read at least one out of the one or more setting items.

* * * * *